United States Patent [19]
Takemura et al.

[11] 3,952,241
[45] Apr. 20, 1976

[54] ELECTRONIC POWER VARYING CONTROLLER DEVICE

[75] Inventors: Takehide Takemura, Hirakata; Shunji Minami, Moriguchi, both of Japan

[73] Assignee: Matsushita Electric Industrial Co., Ltd., Osaka, Japan

[22] Filed: Feb. 20, 1974

[21] Appl. No.: 444,016

[30] Foreign Application Priority Data

| Feb. 20, 1973 | Japan | 48-20898 |
|---|---|---|
| Nov. 20, 1973 | Japan | 48-130980 |
| Nov. 20, 1973 | Japan | 48-130981 |
| Nov. 20, 1973 | Japan | 48-130982 |
| Nov. 20, 1973 | Japan | 48-130983 |
| Nov. 20, 1973 | Japan | 48-130984 |
| Nov. 20, 1973 | Japan | 48-130985 |
| Nov. 20, 1973 | Japan | 48-130986 |
| Nov. 24, 1973 | Japan | 48-132323 |

[52] U.S. Cl. ................. 323/19; 315/307; 317/DIG. 2; 323/24; 323/34
[51] Int. Cl.² ......................................... G05F 3/04
[58] Field of Search .......... 200/181, DIG. 1, DIG. 2; 317/DIG. 2; 323/16, 19, 22 R, 24, 34; 315/196, 251, 294, 297, 307

[56] References Cited
UNITED STATES PATENTS

| 3,593,112 | 7/1971 | Coats et al. | 323/24 |
| 3,647,940 | 3/1972 | Harwood | 323/22 R |
| 3,691,298 | 9/1972 | Pittman et al. | 317/DIG. 2 |
| 3,736,445 | 5/1973 | Van Sickle | 317/DIG. 2 |
| 3,826,970 | 7/1974 | Oka et al. | 323/19 |

*Primary Examiner*—A. D. Pellinen
*Attorney, Agent, or Firm*—Stevens, Davis, Miller & Mosher

[57] ABSTRACT

An electronic power varying controller device adapted for a dimmer, etc. and having substantially no mechanically sliding portions, comprising a thyristor connected with a load such as a lamp, a firing phase controller circuit for the thyristor, a field effect transistor for controlling the firing phase controller circuit, a capacitor connected in parallel with the gate circuit of the field effect transistor, a highly insulating switch connected in series to the gate of the field effect transistor, and a switch to be connected with the highly insulating switch for selecting a positive or negative potential.

17 Claims, 45 Drawing Figures

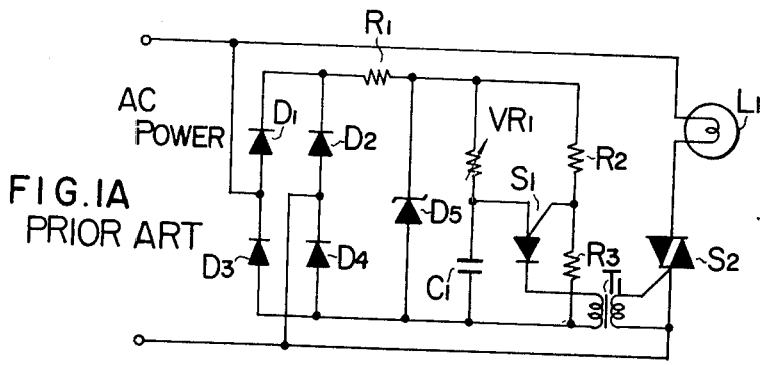
FIG.1A PRIOR ART
FIG.1B PRIOR ART
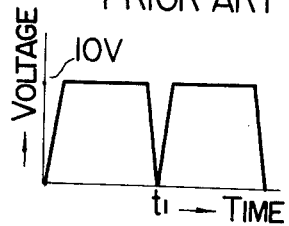
FIG.1C PRIOR ART
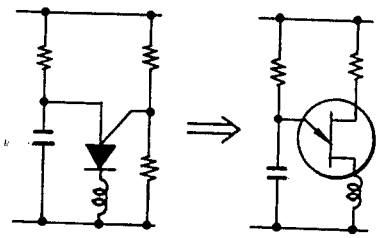
FIG.2
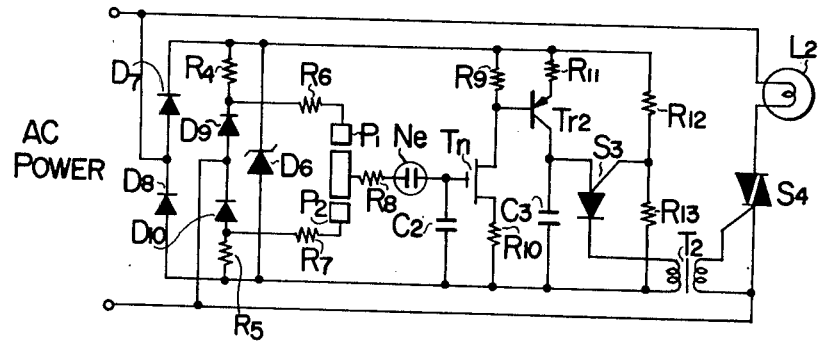

FIG.20
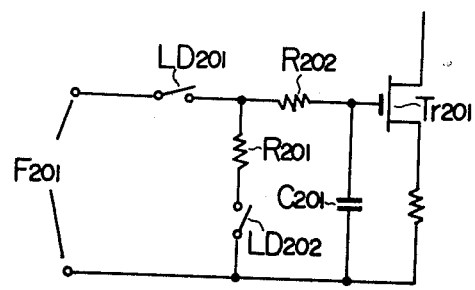
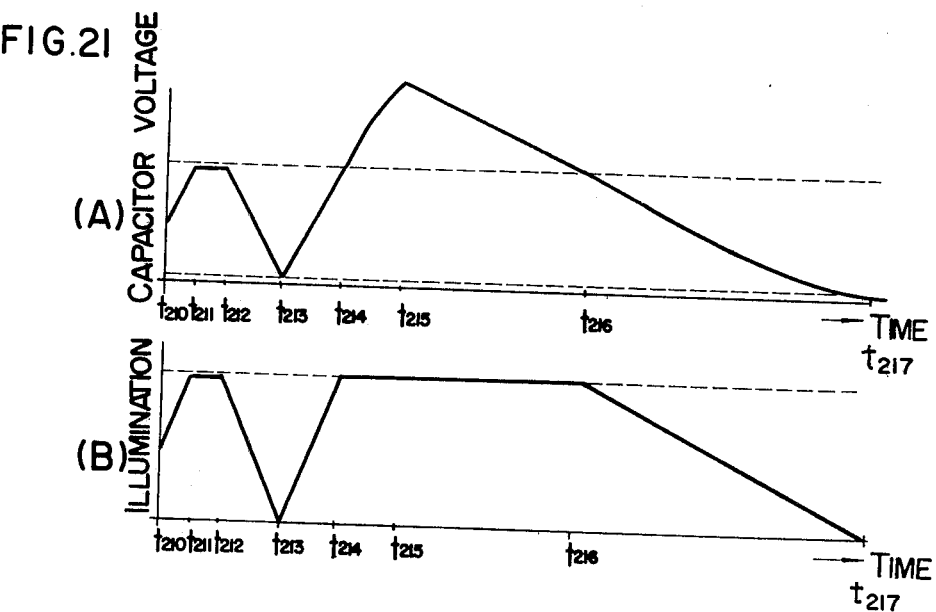
FIG.21

3,952,241

ELECTRONIC POWER VARYING CONTROLLER DEVICE

This invention relates to an electronic power varying controller device, and more particularly to an electronic power varying device having no mechanically sliding portions and providing novel effects.

Description will be made referring to the accompanying drawings, in which:

FIG. 1A is an electric circuit diagram of a conventional dimmer device, FIG. 1B is the voltage waveform across the Zener diode in the circuit of FIG. 1A, and FIG. 1C is partial electric circuit diagrams showing the substitution of the silicon controlled rectifier element with a uni-junction transistor in the circuit of FIG. 1A;

FIG. 2 is an electric circuit diagram of a dimmer including an embodiment of the electronic power varying controller device according to the invention;

FIG. 20 is a basic electric circuit diagram of a timer circuit;

FIG. 21 shows a charging and discharging voltage waveform of the capacitor in the circuit of FIG. 20 and the accompanied change in the intensity of illumination;

Figure 3:
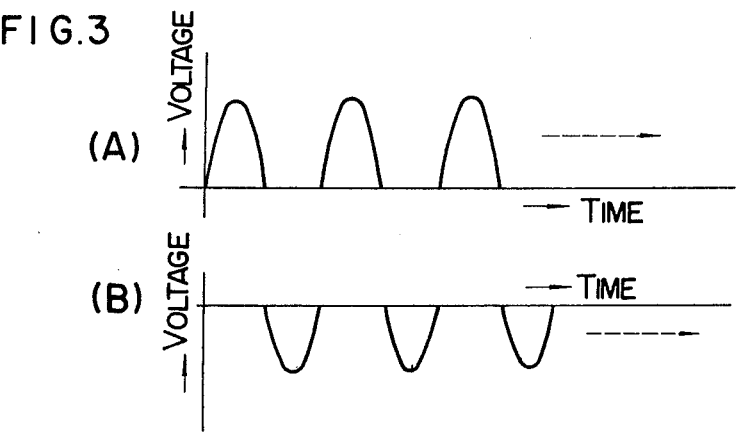
FIG. 3 shows the waveforms of the charging and discharging voltage in the device of FIG. 2.

The conventional electronic power varying controller device will be described taking a dimmer device as an example. The conventional dimmer device of the phase control type using a bi-directional thyristor utilizes a variable resistor and varies the charging time constant for a capacitor to control the firing phase of the thyristor. An example is shown in FIG. 1A.

In FIG. 1A, a capacitor $C_1$ is charged through a variable resistor $VR_1$. Diodes $D_1$ to $D_4$ constitute a full-wave rectifier, the output voltage of which is stabilized by a Zener diode $D_5$ through a resistor $R_1$ (to a voltage of about 10 V). Then, the anode voltage of the Zener diode becomes a trapezoidal shape as shown in FIG. 1B. A series connection of the variable resistor $VR_1$ and the capacitor $C_1$ is connected in parallel with this Zener diode $D_5$. When the charging voltage for capacitor $C_1$ becomes higher than the divided voltage supplied through resistors $R_2$ and $R_3$, a silicon controlled rectifier (SCR) element $S_1$ becomes conductive to discharge the capacitor $C_1$ therethrough. The discharging current is allowed to flow through the primary winding of a transformer $T_1$. The secondary winding of the transformer is connected with the gate circuit of a bi-directional thyristor $S_2$. Thus, a pulse is supplied to the gate of the thyristor $S_2$ to drive it conductive. Then, power is supplied to a lamp $L_1$, which is the load, from a power source through the thyristor $S_2$. Thereafter, when the polarity of the source is reversed, the rectifier element $S_1$ and the thyristor $S_2$ recover to become nonconductive again. Similar actions are repeated thereafter. The time constant for charging the capacitor $C_1$ is changed by changing the variable resistor $VR_1$. When the resistance of the variable resistor $VR_1$ is lower, the voltage across the capacitor $C_1$ reaches the voltage determined by the resistors $R_2$ and $R_3$ more rapidly. The firing phase becomes earlier and the intensity of illumination becomes higher. On the other hand, when the resistance of the variable resistor $VR_1$ becomes higher, the firing phase becomes later and the intensity of illumination becomes lower.

Since such a device as described above utilizes a variable resistor, control of the illumination is accompanied with a sliding action. Thus, the conventional device has such drawbacks that the controlling operation is not very easy and that the service life cannot be very long because of the existence of a mechanically sliding contact. Further, if a variable resistor is to be moved by any means except manually, such means as a motor or a solenoid should be provided.

Although an n-gate silicon controlled rectifier $S_1$ is used in the circuit of FIG. 1A, similar actions can be provided by using a unijunction transistor in place of the silicon controlled rectifier $S_1$, as is shown in FIG. 1C. The same also holds for any of the following circuits, but the description will assume the use of an n-gate silicon controlled rectifier.

An object of the present invention is to provide an electronic power varying device which has removed the conventional drawbacks as described above.

Another object of the present invention is to provide an electronic power varying device having no mechanically sliding portion.

Further object of the present invention is to provide an electronic power varying device capable of remote control.

According to an embodiment of the present invention, the service life is excellent because of the absence of any sliding portion and further, control can also be obtained only by touching two exposed conductive electrodes with a finger. When using a high frequency source, the device can be actuated at a low input voltge. Further, control can be obtained with a simple structure using a highly insulating reed switch. With the addition of a simple structure, excess charging and discharging can be prevented so that the so-called non-operating time can be eliminated and good linearity can be afforded to the change in the charging and discharging voltage with respect to time. Similarly with the addition of a simple structure, timing action can be provided so that the intensity of illumination can be gradually decreased to zero. Further, with the addition of a simple structure, the change in power consumption (e.g. illumination) can be compensated approximately linear with respect to time so as to increase the controlling accuracy. Now embodiments of the present invention will be described in detail referring to the accompanying drawings.

FIG. 2 shows an embodiment of a dimmer device which uses an insulated gate type field effect MOS transistor $Tr_1$ and a pnp transistor $Tr_2$ having a base connected to the drain of said MOS $Tr_1$. The voltage supplied to said MOS $Tr_1$ and said transistor $Tr_2$ is set uniform (about 10V similar to FIG. 1B) by equivalent resistors $R_4$ and $R_5$ and a Zener diode $D_6$. Namely, equivalent resistors $R_4$ and $R_5$ are included in the circuit of diodes $D_7$ to $D_{10}$ constituting a full-wave rectifier. The cathode voltage of the diode $D_9$ is a half-wave rectified positive waveform of an ac source as shown in FIG. 3A and the anode voltage of the diode $D_{10}$ is a half-wave rectified negative waveform lower than that of the anode voltage of $D_9$ by the Zener voltage of the Zener diode $D_6$. This Zener diode $D_6$ is connected between the output terminals of said full-wave rectifying circuit. Each of touch portions $P_1$ and $P_2$ is formed of two conductors disposed to be adjacent to each other with an insulating medium such as air intervening therebetween. Respective one conductors of the touch portions $P_1$ and $P_2$ are formed to be common. The other conductor of the touch portion $P_1$ is connected with the cathode of the diode $D_9$ through a resistor $R_6$. The other conductor of the touch portion $P_2$ is connected with the anode of the diode $D_{10}$ through a resistor $R_7$. A neon discharge lamp Ne is connected to the common conductor of the touch portions $P_1$ and $P_2$ through a resistor $R_8$. The other end of the neon discharge lamp is connected with the gate of said MOS $Tr_1$. A capacitor $C_2$ is connected between the gate of said MOS $Tr_1$ and the anode of the Zener diode $D_6$. A drain resistance $R_9$ is connected between the drain of said MOS $Tr_1$ and the cathode of the Zener diode $D_6$, and a source resistance $R_{10}$ is connected between the source of said MOS $Tr_1$ and the anode of the diode $D_6$. The drain of the MOS $Tr_1$ is connected with the gate of another transistor $Tr_2$. An emitter resistance $R_{11}$ is connected between the emitter of the transistor $Tr_2$ and the cathode of the Zener diode $D_6$. A capacitor $C_3$ is connected between the collector of the transistor $Tr_2$ and the anode of the diode $D_6$. Voltage dividing resistors $R_{12}$ and $R_{13}$ are connected in series between the two terminals of said diode $D_6$. An n-gate silicon controlled rectifier $S_3$ has an anode connected with the collector of the transistor $Tr_2$ and a gate with the intermediate point of the voltage dividing resistors $R_{12}$ and $R_{13}$. The cathode of the SCR $S_3$ is connected with one end of the primary winding of a transformer $T_2$, the other end of which is connected with the anode of the diode $D_6$. The secondary winding of the transformer $T_2$ has its one end connected with the gate of a bidirectional thyristor $S_4$ and the other end connected with one primary electrode of the same thyristor $S_4$. One primary electrode of the bidirectional thyristor $S_4$ is connected directly with one terminal of the ac power source and the other primary terminal is connected with the other terminal of the ac power source through a load which is a lamp $L_2$ in this embodiment.

The operation of the above circuit will be described next. When the touch portion $P_1$ is touched with a finger (the resistance of a finger is of the order of several MΩ), the positive half-wave rectified type voltage as shown in A of FIG. 3 is applied to the neon discharge lamp Ne to discharge it. Then, the capacitor $C_2$ is charged through the resistors $R_6$ and $R_8$. When the finger is detached from the touch portion $P_1$ at an appropriate time, the neon discharge tube Ne stops discharging and the charge stored in the capacitor $C_2$ is maintained. Here, since the resistance of the neon discharge tube in its non-discharging state is very high and the gate-source resistance of the insulated gate MOS $TR_1$ is similarly very high, the capacitor $C_2$ maintains its charge for a long time (loss of several % after 1000 hours). The voltage of the charged capacitor $C_2$ (i.e. the gate voltage of the MOS $Tr_1$) is denoted by $E_1$. Then, the drain current of the MOS $Tr_1$ is proportional to the ratio of said voltage $E_1$ to the source resistance $R_{10}$. Here, if the mutual conductance of the MOS $Tr_1$ is low, the proportionality is altered to some extent but the drain current increases with the increase in the voltage $E_1$. Namely, the drain current of the MOS $Tr_1$ can be controlled by the voltage across the capacitor $C_2$. By the flow of said drain current, a voltage drop occurs across the resistance $R_9$ and a collector current determined by the ratio of the voltage to the resistance $R_{11}$ is allowed to flow through the transistor $Tr_2$ to charge the capacitor $C_3$. Thus, the voltage across the capacitor $C_3$ increases and the rate of this increase is controlled by the collector current in the transistor $Tr_2$. Namely, denoting said collector current as I and the capacitance of the capacitor $C_3$ as C, the charged voltage becomes $I \times t/C$. From the above description, the collector current of the transistor $Tr_2$ is controlled by the gate voltage of the MOS $Tr_1$. When the charged voltage of said capacitor $C_3$ increases gradually and becomes equal to or higher than the divided voltage established by the resistors $R_{12}$ and $R_{13}$, the silicon controlled rectifier $S_3$ allows a gate current to flow and becomes conductive. Then, the charge stored in the capacitor $C_3$ is allowed to discharge through the SCR $S_3$ and the transformer $T_2$ to trigger the bidirectional thyristor $S_4$ to become conductive. Hence, power is supplied to the lamp $L_2$ to energize it.

When the polarity of the ac source is reversed, the silicon controlled rectifier $S_3$ and the bidirectional thyristor $S_4$ are rendered non-conductive. Then, similar operations as described above are repeated. Here, if the collector current of the transistor $Tr_2$ is small and the voltage across the capacitor $C_3$ does not exceed said divided voltage in a half cycle of the ac source, since the voltage between the anode and the cathode of the diode $D_6$ becomes zero upon reversal of the polarity of the ac source as is shown in FIG. 1B and the gate voltage of the silicon controlled rectifier $S_3$ which is the divided voltage of said resistors $R_{12}$ and $R_{13}$ becomes zero similar to the voltage between the anode and the cathode of said diode $D_6$, the voltage of the capacitor $C_3$ becomes higher than the trigger voltage of the bidirectional thyristor $S_4$ and a gate current is allowed to flow to drive the SCR $S_3$ conductive and the charge stored in the capacitor $C_3$ is discharged to prepare for the next half cycle.

As is described above, the power supply to a load (lamp $L_2$ in this case) can be controlled by changing the gate voltage of the MOS $Tr_1$, i.e. the charged voltage of the capacitor $C_2$. The charging method for the capacitor $C_2$ is as described above. For discharging the capacitor $C_2$ (lowering the illumination), the touch portion $P_2$ is touched with a finger. Then the negative half-wave rectified voltage as shown by B in FIG. 3 is applied to the neon discharge tube to discharge it and to lower the voltage across the capacitor $C_2$ to decrease the illumination. In short, the capacitor $C_2$ increases the charged voltage by touching the touch portion $P_1$ with a finger and decreases the voltage by touching the touch portion $P_2$ and maintains the voltage otherwise.

Figure 4:
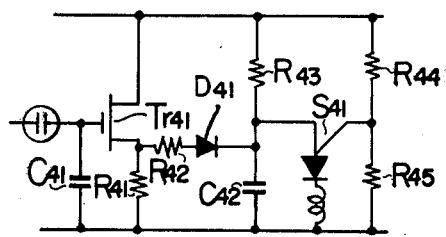
FIGS. 4 and 5 show electric circuit diagrams of other embodiments of the phase controlling circuit in said device.
Figure 5:
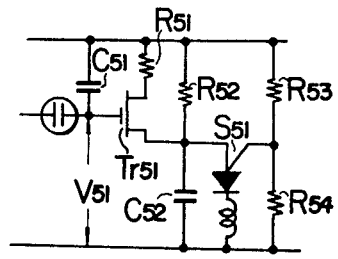

In the above embodiment, control of the charging of the capacitor $C_3$ is done through the combination of a MOS transistor and a PNP transistor. Similar operations can be provided by using circuits as shown in FIGS. 4 and 5. Brief description will be made of the circuits of FIGS. 4 and 5. FIG. 4 shows a portion including a MOS transistor and a silicon controlled rectifier. Other portions of the circuits are the same as FIG. 2. In the figure, the source of the MOS $Tr_{41}$ is connected with one end of a capacity $C_{42}$ and the anode of a silicon controlled rectifier $S_{41}$ through a resistor $R_{42}$ and a diode $D_{41}$. Similar to the circuit of FIG. 2, the gate of the MOS $Tr_{41}$ is biased through a capacitor $C_{41}$, the source of the MOS $Tr_{41}$ is connected with a source resistor $R_{41}$, the anode of the SCR $S_{41}$ is connected with a resistor $R_{43}$, and the resistors $R_{44}$ and $R_{45}$ form a voltage dividing circuit. If said resistor $R_{42}$ is selected to be small, the capacitor $C_{42}$ is charged rapidly to the source voltage of the MOS $Tr_{41}$ (in a time sufficiently short compared to the half cycle of the ac source). Thereafter, the capacitor $C_{42}$ is gradually charged through the resistor $R_{43}$. In this step, the diode $D_{41}$ is reverse biased to isolate the capacitor $C_{42}$ from the MOS $Tr_{41}$. When the charged voltage of said capacitor $C_{42}$ exceeds the gate voltage of the SCR $S_{41}$, the SCR $S_{41}$ becomes conductive. Thus, the firing phase of the SCR $S_{41}$ can be controlled by changing the source voltage of the MOS $Tr_{41}$. Namely, when the source voltage of the MOS $Tr_{41}$ is increased, the voltage to be reached in a short time by the capacitor $C_{42}$ becomes higher and thus the difference from the gate voltage of the SCR $S_{41}$ (the divided voltage of the resistors $R_{44}$ and $R_{45}$) becomes smaller. Then, the SCR $S_{41}$ is triggered at an earlier time, the firing phase becomes earlier, and the intensity of illumination increases. On the contrary, when the source voltage of the MOS $Tr_{41}$ is decreased, the voltage to be reached in a short time by the capacitor $C_{42}$ becomes lower and thus the difference from the gate voltage of the SCR $S_{41}$ becomes larger. Then, the firing phase of the SCR $S_{41}$ becomes later and the intensity of illumination of the lamp decreases. This circuit has an advantage of simpleness compared to the circuit of FIG. 2.

FIG. 5 also shows a portion of the circuit similar to FIG. 4. In the figure, the insulated gate type field effect transistor $Tr_{51}$ is of p-channel (referred to as MOS similar to the above). In the circuits of FIGS. 2 and 4, the MOS was of n-channel, although it was not specified. Selection of p- and n-channel is determined by the polarity of the source to be applied thereto. In FIGS. 2 and 4 also, if the polarity is reversed, a p-channel MOS will be used. Being different from the circuits of FIGS. 2 and 4, a capacitor $C_{51}$ is connected between the gate of the MOS $Tr_{51}$ and the cathode of the Zener diode. As will be understood from the following description, this is based on a consideration that the charge stored in the capacitor $C_{51}$ decreases in a long time (by the insulation resistance of the dielectric in the capacitor) to decrease the illumination of the lamp. There will occur no obstruction in the operation if it is connected similar to the case of FIGS. 2 and 4. The source of said MOS $Tr_{51}$ is connected with the cathode of the Zener diode through a sorce resistance $R_{51}$. On the other hand, the drain is connected with the anode of a silicon rectifier element $S_{51}$ connected with a capacitor $C_{52}$. A resistance $R_{52}$ connects the anode of the SCR $S_{51}$ connected with the capacitor $C_{52}$ with the cathode of the Zener diode, and $R_{53}$ and $R_{54}$ divide the voltage supplied from the Zener diode. In the MOS $Tr_{51}$, the source-drain resistance is changed by the voltage between the gate and the source. When the gate-source voltage $V_{51}$ is increased, the source-drain resistance increases and the firing phase of the silicon controlled rectifier $S_{51}$ delayed. On the other hand, when the voltage $V_{51}$ is decreased, the source-drain resistance is decreased and the firing phase of the SCR $S_{51}$ advanced. Thus, if the touch portion $P_1$ in the circuit of FIG. 2 is touched with a finger, the intensity of illumination of the lamp is decreased in the circuit of FIG. 5. If the touch portion $P_2$ is touched, the illumination of the lamp is increased. These actions work in an opposite way in the circuits of FIGS. 2 and 4. In the above, the source-drain resistance of the MOS $Tr_{51}$ is changed from several hundreds M$\Omega$ to several M$\Omega$ by the gate voltage. The resistance $R_{52}$ limits the maximum value of delay of the firing phase, and the resistance $R_{51}$ limits the minimum value of advance of the firing phase. However, the circuit can work without these resistances.

This system is simple compared to the circuits of FIGS. 2 and 4, but has such drawbacks as the compensation for the linearity of control (linearity of the intensity of illumination of the lamp) cannot be accomplished easily. This system has advantages in that the circuit structure is simple and can be made at a low cost.

Next, embodiments which enable the remote control by further improvements will be described.

As was described in the beginning, according to the conventional dimmer circuit using a variable resistor, remote control can only be done with the provision of mechanical means such as a motor which drives the variable resistor upon reception of an electric signal. According to the present circuit, remote control can be done simply and purely electronically.

Figure 6:
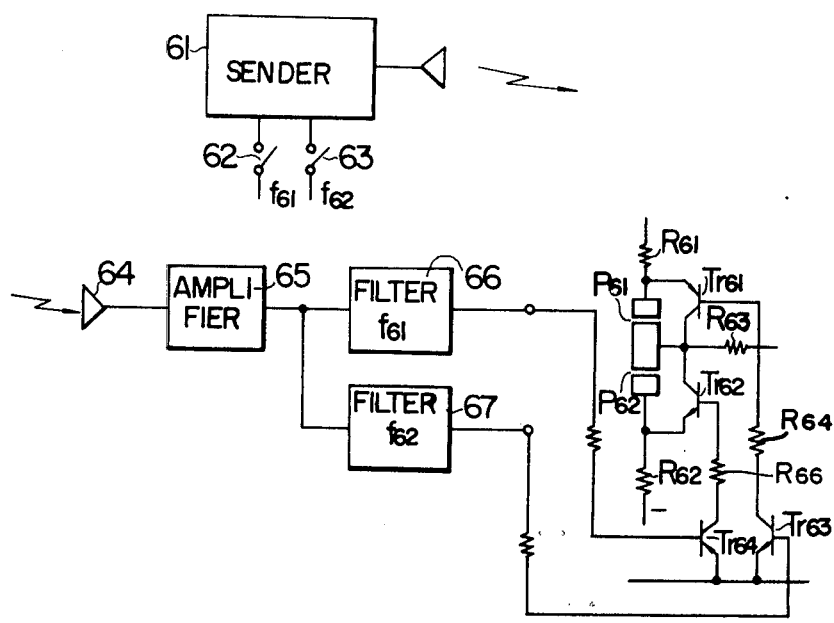
FIG. 6 is an electric circuit diagram of a main part of a dimmer device according to another embodiment of the present invention.

As embodiment capable of remote control is shown in FIG. 6. Although description will be made of remote control by use of a supersonic wave, similar control can be provided by the use of light, electromagnetic wave, magnetic field, etc. In the figure, a sender 61 is provided with two switches 62 and 63 for sending a supersonic wave of frequencies $f_{61}$ and $f_{62}$ respectively. The transmitted supersonic wave is received by a receiver 64, amplified in an amplifier 65, and applied to filter circuits 66 and 67 for selcting the signal of $f_{61}$ and $f_{62}$ respectively. If the switch 62 is depressed and a signal of $f_{61}$ is sent out from the sender 61, a negative ouput is generated from the filter circuit 66 and the transistor $Tr_{64}$ becomes conductive. In FIG. 6, a resistance $R_{61}$ corresponds to the resistance $R_6$ in the circuit of FIG. 2, similarly a resistance $R_{62}$ to the resistance $R_7$, a resistance $R_{63}$ to the resistance $R_8$, a touch portion $P_{61}$ to the touch portion $P_1$, and another touch portion $P_{62}$ to the touch portion $P_2$. The common conductor of the touch portions $P_{61}$ and $P_{62}$ is connected to the collectors of transistors $Tr_{61}$ and $Tr_{62}$ and the other conductors of the touch portions $P_{61}$ and $P_{62}$ are connected with the emitters of said transistors $Tr_{61}$ and $Tr_{62}$. The bases of said transistors $Tr_{61}$ and $Tr_{62}$ are connected to the collectors of transistors $Tr_{63}$ and $Tr_{64}$ through resistors $R_{64}$ and $R_{66}$, respectively. The emitters of these transistors $Tr_{63}$ and $Tr_{64}$ are grounded.

Here, the assumption is made that an input is supplied to the transistor $Tr_{64}$ to drive it conductive. Then a base current for the transistor $Tr_{62}$ is allowed to flow to drive this transistor $Tr_{62}$ conductive. Then, the neon discharge tube shown in FIG. 2 is allowed to discharge through a resistor $R_{63}$ so as to discharge the charge stored in the capacitor $C_2$ shown in FIG. 2. Next, if the switch 63 of the sensor 61 is connected, a positive output voltage is generated from the filter circuit 67 to drive the transistor $Tr_{63}$ conductive. Then, the transistor $Tr_{61}$ becomes conductive and the capacitor $C_2$ shown in FIG. 2 is charged through the resistor $R_{63}$. Thereby, the light control for the lamp $L_2$ can be provided. Here, in the circuit of FIG. 6, if the leak current in the transistors $Tr_{61}$ and $Tr_{62}$ are not small and not equal, the neon discharge tube N$e$ may discharge even in the absence of an input signal to charge or discharge the capacitor $C_2$.

Figure 7:
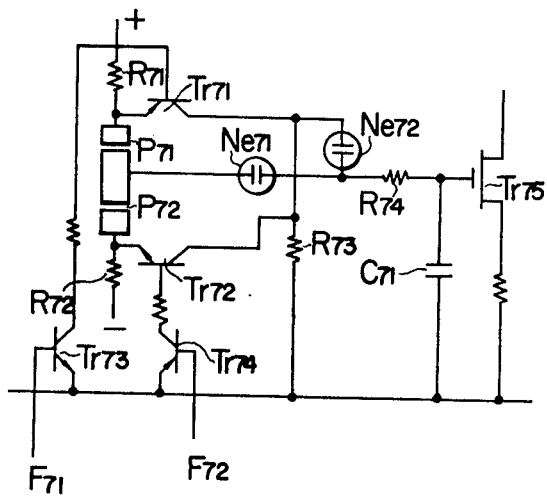
FIG. 7 is an electric circuit diagram of a modification of the circuit of FIG. 6.

This possibility can be removed by such circuit as shown in FIG. 7.

Referring to FIG. 7, when no input is supplied to remote control input terminals $F_{71}$ and $F_{72}$ and a touch portion $P_{71}$ is touched with a finger, a neon discharge tube N$e_{71}$ is allowed to discharge to charge a capacitor $C_{71}$ through a resistor $R_{74}$. Similarly, when a touch portion $P_{72}$ is touched with a finger, the capacitor $C_{71}$ discharges. When an input is supplied to the input terminal $F_{71}$, transistors $Tr_{73}$ and $Tr_{71}$ become conductive and a neon discharge tube N$e_{72}$ is allowed to discharge to charge the capacitor $C_{71}$. Similarly, when an input is supplied to the other input terminal $F_{72}$, transistors $Tr_{74}$ and $Tr_{72}$ become conductive and the neon discharge tube N$e_{72}$ is allowed to discharge to discharge the capacitor $C_{71}$. According to this circuit, even if the transistors $Tr_{71}$ and $Tr_{72}$ allow large and different leak currents, the voltage across the resistor $R_{73}$ cannot exceed the firing voltage of the neon discharge tube N$e_{72}$ and a malfunction is prevented provided that the resistance $R_{73}$ is selected appropriately. The intensity control of the lamp $L_2$ is provided through the output of a MOS $Tr_{75}$ as is described above. In FIG. 7, resistors $R_{71}$ and $R_{72}$ correspond to the resistors $R_6$ and $R_7$ in the circuit of FIG. 2. Similarly said touch portions $P_{71}$ and $P_{72}$ correspond to the touch portions $P_1$ and $P_2$, a resistor $R_{74}$ to the resistor $R_8$, the capacitor $C_{71}$ to the capacitor $C_2$, the N$e$ discharge tube N$e_{71}$ and N$e_{72}$ to the neon discharge tube N$e$, and the MOS $Tr_{75}$ to the MOS $Tr_1$. Further, although the circuits of FIGS. 6 and 7 are abbreviated, it will be apparent that those portions abbreviated are the same as the corresponding portions of the circuit of FIG. 2 (naturally including the cases of FIGS. 4 and 5).

In the embodiments described hereinabove, the capacitor inserted in the gate circuit of the MOS was charged and discharged through a neon discharge tube by deriving a voltage (positive and negative) above the firing voltage of the neon discharge tube from a bridge rectifier circuit, and touching a pair of conductors with a finger to transmit the voltage through the resistance of the finger. In the following, embodiments which do not require a voltage (positive or negative) above the firing voltage will be described.

Figure 8A:
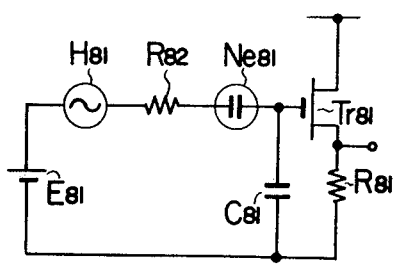
FIGS. 8A and 8C are electric circuit diagrams showing the principles for charging and discharging a capacitor with the use of a high frequency source.
Figure 8C:
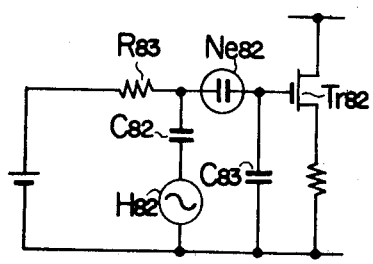
Figure 8B:
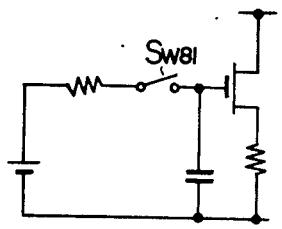
FIG. 8B is an equivalent electric circuit.

FIGS. 8A and 8C show basic arrangements. In FIG. 8A, a capacitor $C_{81}$ is connected between the gate of a MOS $Tr_{81}$ and one end of a source resistor $R_{81}$ the other end of which is connected to the source of said MOS $Tr_{81}$. The drain of the MOS $Tr_{81}$ is connected with a drain voltage source (not shown). Further, the gate of the MOS $Tr_{81}$ is connected to a high frequency source $H_{81}$ (above the firing voltage of a neon discharge tube N$e_{81}$) and a dc source $E_{81}$ through a series circuit of a neon discharge tube $Ne_{81}$ and a resistance $R_{82}$. The frequency of said high frequency source $H_{81}$ is selected in such a manner that the reactance of the capacitor $C_{81}$ is small compared to the resistance $R_{82}$. Thus, when the high frequency source $H_{81}$ is turned on and the neon discharge tube $Ne_{81}$ begins to discharge, a high frequency current is allowed to flow but it generates almost no high frequency voltage across the capacitor $C_{81}$ from the above relation between the resistance $R_{82}$ and the capacitance $C_{81}$. Thus, the capacitor $C_{81}$ is charged by a dc voltage from the dc source $E_{81}$. When the high frequency source $H_{81}$ is turned off, the neon discharging tube $Ne_{81}$ stops discharge and the charge stored in the capacitor $C_{81}$ is maintained. When the dc source $E_{81}$ is reversed in polarity or decreased to zero and the high frequency source $H_{81}$ is turned on, the neon discharge tube $Ne_{81}$ begins discharge and the charge stored in the capacitor $C_{81}$ is discharged. This circuit can be considered to be equivalent to the circuit shown in FIG. 8B. In the figure, a switch $Sw_{81}$ can be considered to be turned on by turning on the high frequency source $H_{81}$.

FIG. 8C shows another arrangement in which a high frequency source $H_{82}$ is connected with the intermediate point of the neon discharge tube $Ne_{82}$ and a resistor $R_{83}$ through a capacitor $C_{82}$. The other end of the neon discharge tube $Ne_{82}$ is connected with the gate of a MOS $Tr_{82}$. If the capacitance $C_{82}$ is selected sufficiently small compared to the capacitance $C_{83}$, the neon discharge tube $Ne_{82}$ is allowed to discharge to charge a dc potential in the capacitor $C_{83}$ upon turning on the high frequency source $H_{82}$. Here, since the capacitance $C_{82}$ is selected as above, almost no high frequency voltage is established across the capacitor $C_{83}$. This circuit shown in FIG. 8C is also equivalent to the circuit of FIG. 8B.

Figure 9:
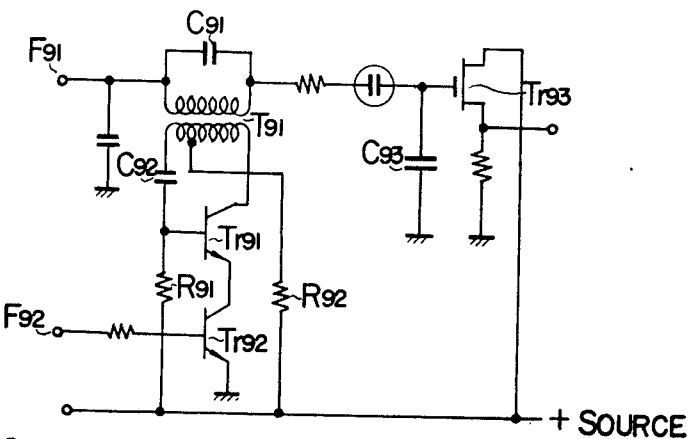
FIG. 9 is an electric circuit diagram of a concrete embodiment of a circuit for carrying out charging and discharging with the use of a high frequency source.

Next, a concrete embodiment of the circuit of FIG. 8A or 8C is shown in FIG. 9. In the figure, a transistor $Tr_{91}$, a transformer $T_{91}$, capacitors $C_{91}$ and $C_{92}$, and resistors $R_{91}$ and $R_{92}$ form an oscillation circuit, and generate a high frequency voltage (for example, 100 kHz, 300 $V_{p-p}$) in the secondary winding of the transformer $T_{91}$ (on the side of the capacitance $C_{91}$). Oscillation is turned on and off by allowing and interrupting a current flow to the base of a transistor $Tr_{92}$ which is connected with the emitter of the transistor $Tr_{91}$. A capacitor $C_{93}$ connected with the gate of a MOS $Tr_{93}$ is charged by applying voltages to the terminals $F_{91}$ and $F_{92}$. When a voltage is applied to the terminal $F_{92}$, the oscillation circuit generates a high frequency voltage across a neon discharge tube to fire it. Then the capacitor $C_{93}$ is charged with the voltage applied to the terminal $F_{91}$.

Figure 10:
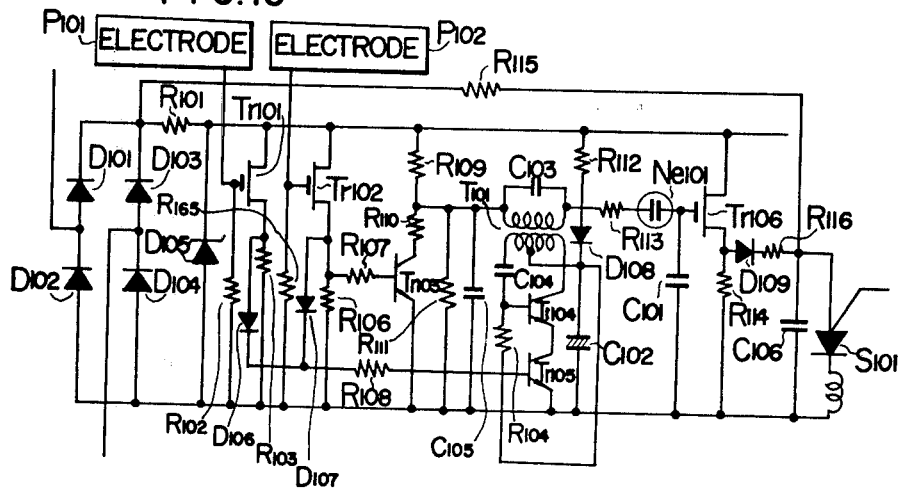
FIG. 10 is an electric circuit diagram of a dimmer device according to another embodiment of the present invention.

Another embodiment based on the foregoing embodiments shown in FIGS. 2 and 6 and provided with an additional function is shown in FIG. 10, in which a dimmer circuit is partially shown. Those portions not shown in the figure are smaller to the corresponding portions of FIG. 2.

In the figure, a full-wave rectifier is formed of diodes $D_{101}$ to $D_{104}$. A Zener diode $D_{105}$ is connected with to the output of the full-wave rectifier through a resistor $R_{101}$. Exposed conducting electrode $P_{101}$ and $P_{102}$ are connected to the gates of enhancement mode MOSs $Tr_{101}$ and $Tr_{102}$. When one electrode $P_{101}$ is touched with a finger, an ac voltage induced in the human body is applied to the gate of the amplifying MOS $Tr_{101}$ and a half-wave rectified voltage is generated at the source. Thereby, an input is supplied to the base of a transistor $Tr_{105}$ to begin oscillation of an oscillation circuit formed of a transistor $Tr_{104}$, capacitors $C_{102}$, $C_{103}$, and $C_{104}$, a diode $D_{108}$, a transformer $T_{101}$, and a resistor $R_{104}$. Here, since the output of the MOS $Tr_{101}$ is a half-wave rectified ac voltage (a square wave voltage in the case of a large input), oscillation occurs intermittently but it causes no problem. In response to said oscillation, a neon discharge tube $Ne_{101}$ is allowed to discharge to charge a capacitor $C_{101}$. Here, the charging voltage is given as a divided voltage through resistors $R_{109}$ and $R_{111}$. The purpose of this voltage division is to permit adjustment of the charging voltage. When the finger is detached from the electrode $P_{101}$, the oscillation of the oscillator circuit stops and the discharge in the neon discharge tube $Ne_{101}$ stops to maintain the charge stored in the capacitor $C_{101}$. On the other hand, when the electrode $P_{102}$ is touched with a finger, the enhancement mode MOS $Tr_{102}$ constituting an amplifier stage generates a half-wave rectified voltage at the source to activate the oscillation circuit similarly to the above. At the same time, an input is also supplied to the base of a transistor $Tr_{103}$ to drive it conductive. Then, the voltage applied to one end of the secondary winding of the transformer $T_{101}$ in the oscillator circuit becomes the divided voltage determined by resistances $R_{109}$ and $R_{110}$ and hence the capacitor $C_{101}$ discharges. Here, the voltage division by the resistors $R_{109}$ and $R_{110}$ is for adjusting the discharge voltage. Here, since the source voltage of the transistor $Tr_{102}$ is a half-wave rectified voltage, the transistor $Tr_{103}$ is turned on and off correspondingly. But when it is turned off, the oscillation circuit is turned off also and there arises no problem. Further although a diode $D_{108}$ and a capacitor $C_{102}$ are inserted for smoothing the voltage to be applied to the oscillation circuit, the circuit can also work without them. In the figure, reference notations $R_{102}$, $R_{103}$, $R_{105}$ to $R_{108}$ and $R_{112}$ to $R_{116}$ denote resistors, $C_{105}$ and $C_{106}$ capacitors, $D_{106}$, $D_{107}$ and $D_{109}$ diodes, $Tr_{106}$ MOS, and $S_{101}$ silicon controlled rectifier. These elements are similar to those of FIG. 2 and description is dispensed with. In the structure of FIG. 10, it is to be noted that only two exposed electrodes $P_{101}$ and $P_{102}$ will do the function compared to a pair of opposed electrodes in the case of FIG. 2 etc.

Figure 11:
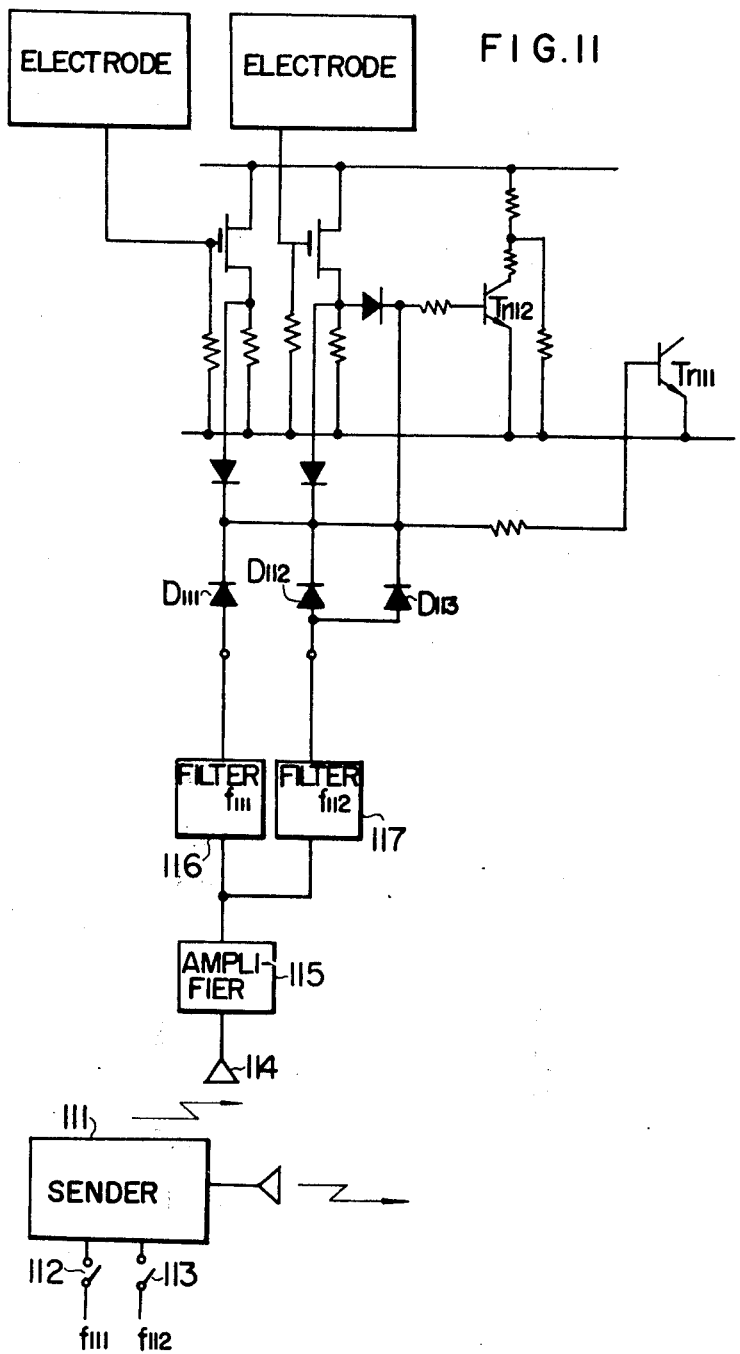
FIG. 11 is an electric circuit diagram of a dimmer device according to another embodiment of the present invention.

Another embodiment on a dimmer device is shown in FIG. 11, which is also a partial circuit diagram. Those portions not shown in the figure are similar to those in FIG. 2 or 10 and will be understood readily. Although description will be made of a remote control using an ultrasonic wave, similar control can be obtained by the use of light, electromagnetic wave, magnetic field, etc.

In the figure, when a switch 112 or 113 in the sender 111 is depressed, an ultrasonic wave of a frequency $f_{111}$ or $f_{112}$ is sent out. This ultrasonic wave is received in a receiver 114, amplified in an amplifier 115, and applied to filter circuits 116 and 117. Supposing that the switch 112 is depressed and a signal of the frequency $f_{111}$ is sent from the sender 111, a positive output is generated from the filter circuit 116. The positive output is supplied to the base of an oscillation controlling transistor $Tr_{111}$ (corresponding to the transistor $Tr_{105}$ in FIG. 10) through a diode $D_{111}$ to begin oscillation of the oscillation circuit of FIG. 10 and then to charge the capacitor $C_{101}$ of FIG. 10. When the switch 113 is depressed and a signal of $f_{112}$ is sent from the sender 111, a positive output is generated from the filter circuit 117 and through diodes $D_{112}$ and $D_{113}$ transmitted to the bases of transistors $Tr_{111}$ and $Tr_{112}$ (corresponding to the transistor $Tr_{103}$ in FIG. 10) to drive them conductive. Then, the capacitor $C_{101}$ of FIG. 10 is allowed to discharge. Thus, control of the intensity of the lamp $L_2$ of FIG. 2 is provided.

Figure 12:
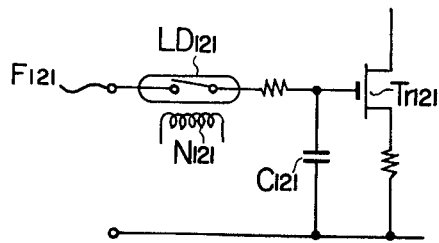
FIG. 12 is an electric circuit diagram of a main part of a dimmer device according to another embodiment of the present invention.
Figure 13:
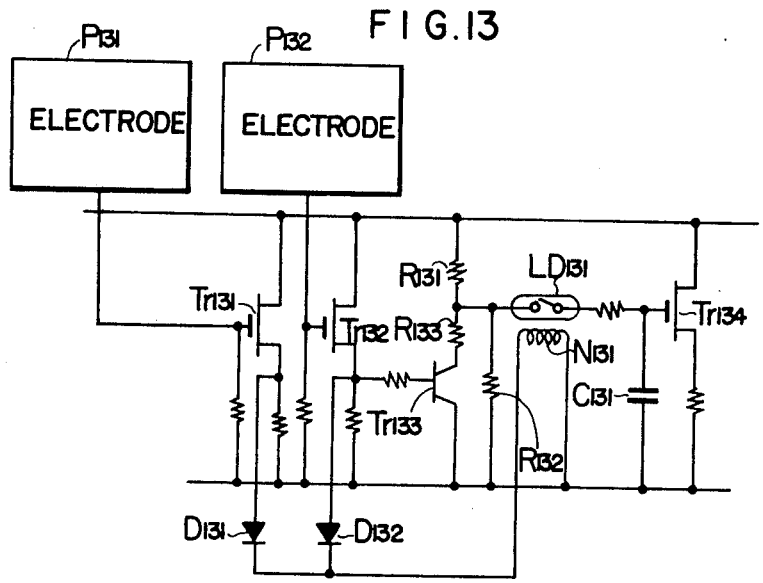
FIG. 13 is an electric circuit diagram of the dimmer device of FIG. 12.

Another embodiment of the power varying controller device having a simpler structure will be described referring to FIG. 12. Namely, in the foregoing embodiments the charge holding capacitor connected with the gate of a MOS was charged through a neon discharge tube, but in this embodiment a highly insulating reed switch is used in place of a neon discharge tube. As shown in the figure, a high insulation reed switch $LD_{121}$ is closed when a current flows through a driving coil $N_{121}$. Then, a capacitor $C_{121}$ connected with the gate of the MOS $Tr_{121}$ is charged or discharged through an input terminal $F_{121}$ and an output is derived from the MOS $Tr_{121}$. A concrete embodiment using the circuit of FIG. 12 is shown in FIG. 13. In FIG. 13, those portions not shown in the figure are similar to those of FIGS. 2, 4, or 5.

Now, when an exposed electrode $P_{131}$ is touched with a finger, an ac voltage induced in the human body is applied to the gate of an enhancement mode MOS $Tr_{131}$ constituting an amplifier stage. Thus, a half-wave rectified voltage output appears at the source to allow a current to flow through a diode $D_{131}$ and a driving coil $N_{131}$. A reed switch $LD_{131}$ is closed by the driving coil $N_{131}$ and a capacitor $C_{131}$ is charged. Here, the charging voltage is given as a divided voltage determined by resistors $R_{131}$ and $R_{132}$. This voltage division is made for adjusting the carrying voltage. The reed switch $LD_{131}$ is driven by a half-wave rectified current and thus is repeatedly closed and opened, but it causes no problem. Next, when the finger is detached from the electrode $P_{131}$, no current is allowed to flow through the driving coil $N_{131}$ and the reed switch $LD_{131}$ is opened. Thus, the charge stored in the capacitor $C_{131}$ is held. Then, when the electrode $P_{132}$ is touched with a finger, an output is derived from the source of an enhancement mode MOS $Tr_{132}$ and sent to the driving coil $N_{131}$ to close the reed switch $LD_{131}$ on one hand. On the other hand, the transistor $Tr_{133}$ is driven conductive by said output. Thus, the voltage at one end of the reed switch $LD_{131}$ becomes the divided voltage determined by resistors $R_{131}$ and $R_{133}$. Accordingly, the capacitor $C_{131}$ discharges. Control of the intensity of illumination is provided by the output of the MOS $Tr_{134}$ which corresponds to the charged voltage of the capacitor $C_{131}$ in said manner.

Figure 14:
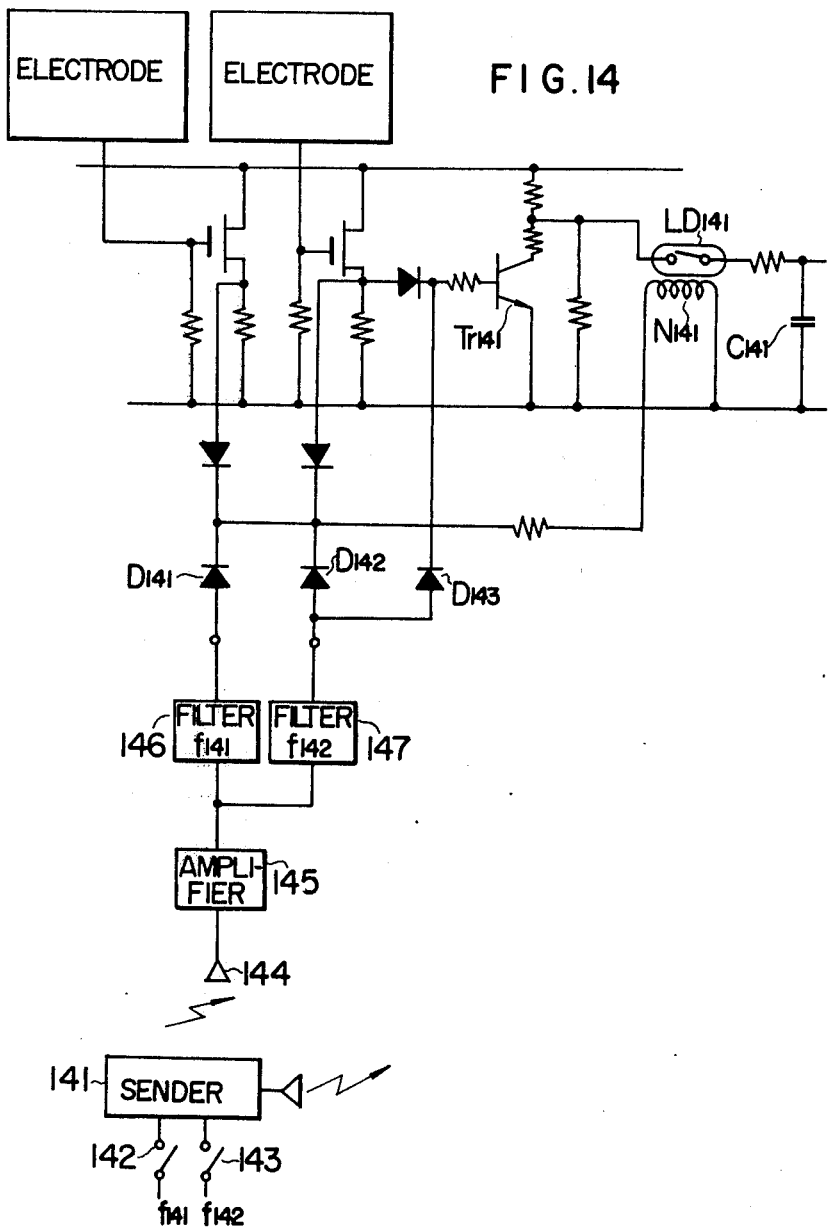
FIG. 14 is an electric circuit diagram of a dimmer device according to another embodiment of the present invention.

Another embodiment of the power varying controller device in a dimmer device is shown in FIG. 14, which is a partial electric circuit diagram. Those portions not shown in the figure are similar to those of FIGS. 2 or 13. An ultrasonic wave is used for remote control in this description, but it may be replaced with any of light, electromagnetic wave, magnetic field, etc.

In FIG. 14, a sender 141 is provided with two switches 142 and 143 for selecting the frequency $f_{141}$ and $f_{142}$. The ultrasonic wave sent from the sender 141 is received in a receiver 144, amplified in an amplifier 145, and applied to filter circuits 146 and 147. Now, if the switch 142 is depressed and a signal of the frequency $f_{141}$ is sent from the sender 141, a positive output is derived from the filter circuit 146 and supplies a current to the driving coil $N_{141}$ through a diode $D_{141}$. Thus, a reed switch $LD_{141}$ is closed and a capacitor $C_{141}$ is charged. Next, when the switch 143 is depressed and a signal of frequency $f_{142}$ is sent from the sender 141, a positive output is generated from the filter circuit 147 and supplies a current to the driving coil $N_{141}$ to close the reed $LD_{141}$ through a diode $D_{142}$ and also drive a transistor $Tr_{141}$ conductive through a diode $D_{143}$ to discharge the capacitor $C_{141}$. Thus, the control for the intensity of illumination of the lamp $L_2$ in FIG. 2 can be accomplished.

Figure 15:
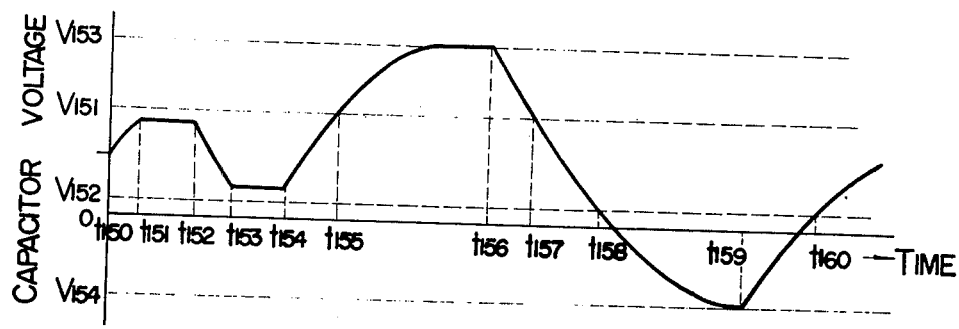
FIG. 15 is a voltage waveform showing the change of charging and discharging of the capacitor of FIG. 2.

The change in the voltage at the capacitor $C_2$ in said FIG. 2 is shown in FIG. 15. In FIG. 15, at time $t_{150}$ the capacitor $C_2$ has a certain voltage and the touch portion $P_1$ is touched with a finger. Then, the capacitor $C_2$ is charged in said manner and the voltage gradually increases almost exponentially. The rate of increase is determined by the voltage A of FIG. 3A, the resistance of the finger, the resistances $R_6$ and $R_8$, the discharge voltage of the neon discharge tube Ne, and the capacitance of the capacitor $C_2$. Then, if the finger is detached at time $t_{151}$, the capacitor $C_2$ holds the voltage thereafter. At time $t_{152}$, the tough portion $P_2$ is touched with a finger. Then, the voltage decreases gradually. The rate of this decrease is almost similarly determined as said rate of increase, but the resistance $R_6$ is replaced with the resistance $R_7$ and the voltage shown by A is replaced with the voltage shown by B in FIG. 3. Here, since the electrodes $P_1$ and $P_2$ and hence the resistors $R_6$ and $R_7$ are touched with a bare finger, the resistances $R_6$ and $R_7$ are selected above $1M\Omega$ for safety. The resistance $R_8$ is selected sufficiently large to decrease the fluctuations in the rate of charging and discharging due to the fluctuations of the resistance of fingers.

In the above circuit, no consideration is made for the excess charging or discharging. Referring to FIG. 15, the ordinate represents the voltage across the capacitor $C_2$ connected with the gate of the MOS $Tr_1$ in FIG. 2, and the abscissa represents time. If the touch portion $P_1$ is touched with a finger at time $t_{154}$, the voltage across the capacitor $C_2$ increases and the intensity of illumination of the lamp $L_2$ increases. Here, suppose that the capacitor voltage at which the lamp $L_2$ gives the maximum intensity of illumination is $V_{151}$. Then, the intensity of illumination becomes maximum at time $t_{155}$. If the positive half-wave rectified voltage is too high, the capacitor voltage keeps increasing and approaches a certain voltage $V_{153}$. Thus, when the touch portion $P_2$ is touched with a finger at time $t_{156}$, the capacitor voltage decreases but the intensity of illumination does not change until time $t_{157}$. Then, the intensity gradually decreases from time $t_{157}$ to time $t_{158}$. But if the negative half-wave voltage is also too high, the capacitor voltage keeps decreasing even after the intensity decreases to zero and the voltage approaches a certain voltage $V_{154}$. Then, if the touch portion $P_1$ is again touched with a finger at time $t_{159}$, the capacitor voltage increases but the intensity of illumination is zero until time $t_{160}$. At time $t_{160}$, the capacitor voltage exceeds the minimum illumination voltage $V_{152}$ and the illumination gradually increases.

As is apparent from the above description, when charging was done excessively, there occurs an insensitive time $t_{156}$ to $t_{157}$ in FIG. 15 for lowering the intensity of illumination. Similarly, when discharging was done excessively, there occurs an insensitive time $t_{159}$ to $t_{160}$ for increasing the intensity of illumination.

Figure 16:
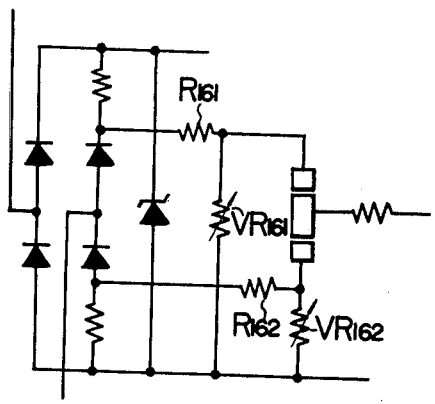
FIG. 16 is an electric circuit diagram of a main part of a circuitry for removing the blind time in the circuit of FIG. 2.
Figure 17:
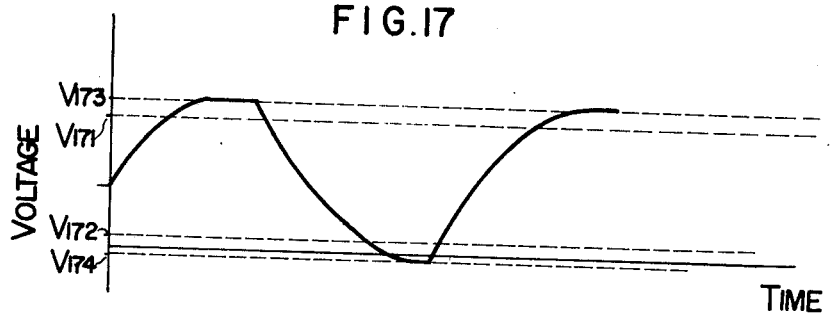
FIG. 17 is a voltage waveform showing the change of charging and discharging of the capacitor in the circuit of FIG. 16.

The occurrence of such insensitive time is due to the fact that the charging and/or discharging voltage is too high. This problem is solved in the circuit of FIG. 16, in which the source voltage is divided by a variable resistor $VR_{161}$ and a resistor $R_{161}$ to bring the asymptotic charging voltage $V_{173}$ (corresponding to $V_{155}$ in FIG. 15) down to the neighborhood of the maximum illumination voltage $V_{171}$ (corresponding to $V_{151}$ in FIG. 15) as is shown in FIG. 17. Similarly, the asymptotic discharging voltage $V_{171}$ (corresponding to $V_{154}$) may be elevated to nearly the minimum illumination voltage $V_{172}$ (corresponding to $V_{152}$) by a variable resistor $VR_{162}$ and a resistor $R_{162}$. In such a manner, the insensitive time can be shortened. In FIG. 16, variable resistors $VR_{161}$ and $VR_{162}$ are used for finely adjusting the voltage division, but they may be replaced with fixed resistors.

This circuit is simple, but the voltage change with respect to time may differ for charging and discharging and hence the intensity of illumination may change at different rates for increasing and decreasing.

Figure 18:
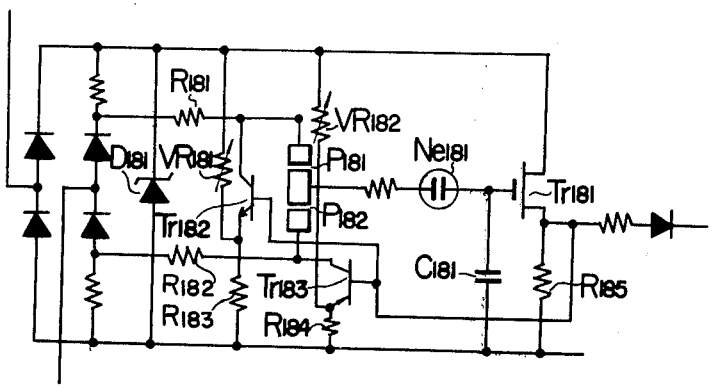
FIG. 18 is an electric circuit diagram of a dimmer device according to another embodiment of the present invention.

A further improved embodiment in which the insensitive time (excess charging or discharging) is eliminated and the voltage changes linearly with respect to time for charging and discharging is shown in FIG. 18.

FIG. 18 shows a partially abbreviated dimmer circuit using the system of FIG. 4. It can similarly be applied to the circuit of FIG. 2. First, the cause of the different change for charging and discharging is due to smallness of the difference between the maximum and the minimum illumination voltages $V_{171}$ and $V_{172}$ and the asymptotic voltages $V_{173}$ and $V_{174}$, as will be seen in FIG. 17. When the difference is large as in FIG. 15, the voltage change becomes almost linear between the maximum illumination voltage $V_{151}$ and the minimum illumination voltage $V_{152}$. But, without any modification, the insensitive time cannot be removed.

Figure 19:
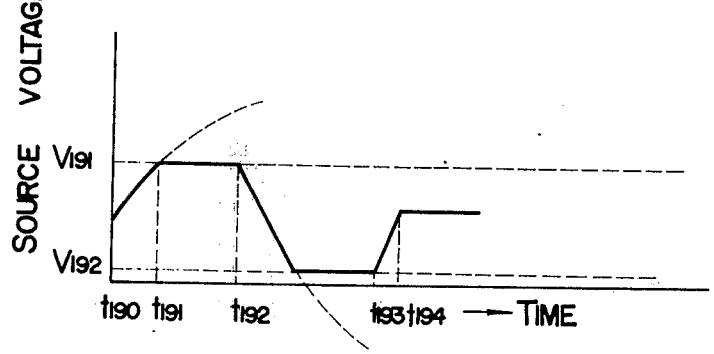
FIG. 19 is a voltage waveform showing the change of charging and discharging of the capacitor in the circuit of FIG. 18.

The embodiment of FIG. 18 is so arranged that when the charging or discharging voltage exceeds the maximum or minimum illumination voltage $V_{151}$ or $V_{152}$, it can be detected to stop the charging or discharging. Namely, the collector of an npn transistor $Tr_{182}$ is connected with a resistor $R_{181}$ on the touch portion $P_{181}$ side, the emitter is connected with the anode side of a Zener diode $D_{181}$ through a resistor $R_{183}$ and also the same emitter is connected with the cathode side of the Zener diode $D_{181}$ through a variable resistor $VR_{181}$. Thus, a bias voltage $V_{181B}$ determined by the voltage division of the resistors $R_{183}$ and $VR_{181}$ is established at the emitter. On the other hand, the base of the transistor $Tr_{182}$ is connected with the source of a MOS $Tr_{181}$. Further, a pnp transistor $Tr_{183}$ has the collector connected to a resistor $R_{182}$ on the touch portion $P_{182}$ side, the emitter connected with the anode side of the Zener diode $D_{181}$ through a resistor $R_{184}$, and with the cathode side of the Zener diode $D_{181}$ through a variable resistor $VR_{182}$. Thus, the emitter is biased by a voltage $V_{182B}$ formed by the resistors $R_{184}$ and $VR_{182}$ on the other hand the base of the transistor $Tr_{183}$ is connected with the source of the MOS $Tr_{181}$. If the touch portion $P_{181}$ is touched with a finger, a neon discharge tube $Ne_{181}$ discharges to charge a capacitor $C_{181}$ and hence to raise the source voltage of the MOS $Tr_{181}$. If the source voltage $Vs_{181}$ and said bias voltages $V_{181B}$ and $V_{182B}$ are in a relation of $V_{181B} > Vs_{181} > V_{182B}$, since the bases of the transistors $Tr_{182}$ and $Tr_{183}$ are reversely biased the two transistors are nonconductive. When the source voltage $Vs_{181}$ increases to satisfy the relation $V_{181B} < vs_{181}$, the base of the transistor $Tr_{182}$ is forwardly biased and the transistor $Tr_{182}$ becomes conductive. Then, the collector voltage decreases below the discharge voltage of the neon discharge tube $Ne_{181}$, and the neon discharge tube stops discharging to stop charging of the capacitor $C_{181}$. Next, when the touch portion $P_{182}$ is touched with a finger, since the base voltage of the transistor $Tr_{183}$ is in the relation of $Vs_{181} > V_{182B}$ and the transistor $Tr_{183}$ is nonconductive, the neon discharge tube $Ne_{181}$ dicharges to discharge the charge stored in the $C_{181}$. When the source voltage of the MOS $Tr_{181}$ dereases to satisfy $Vs_{181} < V_{182B}$, the base of the transistor $Tr_{183}$ is forwardly biased to drive the transistor conductive. Then, the collector voltage falls below the discharge voltage of the neon discharge tube $Ne_{181}$ to stop discharging and thereby the source voltage of the MOS $Tr_{181}$ does not decrease any further. When said bias voltages $V_{181B}$ and $V_{182B}$ are selected to the maximum and minimum illumination voltage of the source voltage of the MOS $Tr_{181}$ by adjusting the variable resistors $VR_{181}$ and $VR_{182}$, the source voltage changes linearly with respect to time and there is no insensitive time. The manner of this operation is illustrated in FIG. 19. When the touch portion $P_{181}$ is touched with a finger at time $t_{190}$, the source voltage of the MOS $Tr_{181}$ gradually increases and reaches the maximum illumination voltage $V_{191}$. Then, the transistor $Tr_{182}$ becomes conductive and the voltage increases no more. Next, when the touch portion $P_{182}$ is touched with a finger at time $t_{192}$, the voltage begins to decrease and the illumination decreases. When the voltage reaches the minimum illumination voltage $V_{192}$, the transistor $Tr_{183}$ becomes conductive to stop discharging. If the touch portion $P_{181}$ is touched again with a finger at time $t_{193}$, the voltage increases again. If the finger is detached at time $t_{194}$, the voltage at the moment will be held.

Thus, according to the above circuit, consideration is made for the insensitive time, a difference in the source voltage change of the MOS for charging and discharging is eliminated, and the change of the source voltage with respect to time becomes linear.

Another embodiment using a circuit for remembering a voltage for a long time by the combination of the MOS and the capacitor as a timer will be described. The control of the intensity of illumination is done with the timer function.

FIG. 20 shows a basic circuit diagram for a modified dimmer circuit. In FIG. 20, reed switches $LD_{201}$ and $LD_{202}$ are used and a dimmer circuit as described hereinabove is connected after the MOS $Tr_{201}$. Now, if the reed switch $LD_{201}$ is closed (another switch $LD_{202}$ is open at this moment), a capacitor $C_{201}$ is charged through input terminals $F_{201}$. The change in the capacitor voltage is shown by A in FIG. 21 with a corresponding curve B showing the illumination change. Now, when the switch $LD_{201}$ is closed at time $t_{210}$ to achieve charging, the voltage across the capacitor $C_{201}$ and hence the illumination keep increasing to time $t_{211}$. The switch $LD_{20}$ is opened at time $t_{211}$ and the illumination is held there. Then, an opposite voltage to said one is applied to the input terminal $F_{201}$ at time $t_{212}$ and the switch $LD_{201}$ is closed to discharge the capacitor $C_{201}$. The intensity of illumination decreases until time $t_{213}$. If a charging voltage is again applied to the input terminal $F_{201}$, the intensity of illumination increases, reaches the maximum at time $t_{214}$ but continues charging. At time $t_{215}$, the switch $LD_{201}$ is opened and the switch $LD_{202}$ is closed to discharge the charge stored in the capacitor $C_{201}$ through a resistor $R_{202}$ and a discharging resistor $R_{201}$. The voltage of the capacitor $C_{201}$ gradually decreases and the intensity of illumination keeps the maximum value until time $t_{216}$. After the time $t_{216}$, the intensity of illumination decreases gradually and becomes zero at time $t_{217}$. Here, if the discharging resistance $R_{201}$ is made large, the times $t_{215}$ to $t_{216}$ and $t_{216}$ to $t_{217}$ becomes long.

Figure 22:
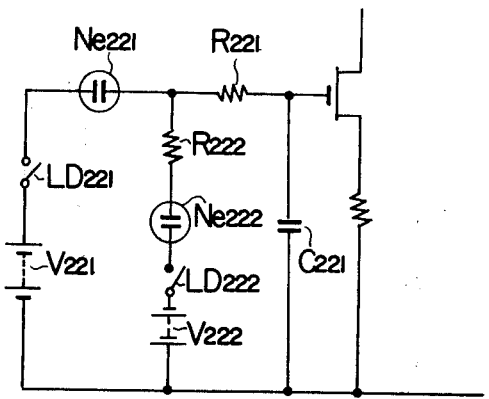
FIG. 22 is an electric circuit diagram of a similar circuit as that of FIG. 20 but using neon discharge tubes.

Next, a concrete embodiment is shown in FIG. 22, in which reed switches $LD_{221}$ and $LD_{222}$ are used in place of the switched $LD_{201}$ and $LD_{202}$ and are driven by driving coils. A neon discharge tube $Ne_{221}$ is used in FIG. 22. In the figure, a voltage source $V_{221}$ supplies a positive and negative voltage above the discharge voltage of the neon discharge tube $Ne_{221}$ (figure shows only a positive voltage source). Charging and discharging of a capacitor $C_{221}$ is done by this voltage souce $V_{221}$ through said neon discharge tube $Ne_{221}$, and a resistor $R_{221}$ and by closing the switch $LD_{221}$. Upon closing a switch $LD_{222}$, the neon discharge tube $Ne_{222}$ begins discharge by a negative voltage $V_{222}$ and the charge stored in the capacitor $C_{221}$ is allowed to discharge through a discharging resistor $R_{222}$, thereby providing the characteristics of FIG. 21. Here, if the negative voltage source is replaced with a positive voltage source, such a characteristic opposite to that of FIG. 21 can be obtained that the intensity of illumination remains at zero for a certain period and gradually increases.

As is described above, a timer circuit can be combined in the circuit of FIG. 2 according to this invention.

Figure 23:
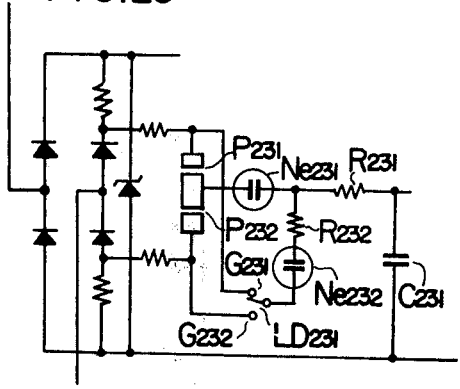
FIG. 23 is an electric circuit diagram of a main portion of a dimmer device according to another embodiment of the present invention.

FIG. 23 shows another embodiment including a timer circuit, in which a neon discharge tube $Ne_{231}$ (corresponding to the neon discharge tube $Ne$ in FIG. 2) is connected at one end to the common conductor of the touch portions $P_{211}$ and $P_{232}$ (corresponding to touch portions $P_1$ and $P_2$ in FIG. 2) and at the other end to the gate of MOS $Tr_1$ of FIG. 2 through an input resistor $R_{231}$ (corresponding to the input resistor $R_8$). Further, a gate capacitor $C_{231}$ (corresponding to $C_2$) is connected with the gate of the MOS $Tr_1$, similar to FIG. 2. Those portions not shown in FIG. 23 are similar to those of FIG. 2, 4 or 5. One end of a discharging resistor $R_{232}$ is connected with the intermediate point of said neon discharge tube $Ne_{231}$ and the input resistor $R_{231}$ and the other end of this resistor $R_{232}$ is connected with the movable contact of a switch $LD_{231}$ through a neon discharge tube $Ne_{232}$. Further, the fixed contacts $G_{231}$ and $G_{232}$ of said switch $LD_{231}$ are connected to the respective one conductors of the touch portions $P_{231}$ and $P_{232}$.

When a touch portion $P_{231}$ or $P_{232}$ is touched with a finger, the capacitor $C_{231}$ is charged or discharged as is described above. In performing a timer action, a touch portion $P_{231}$ (or $P_{232}$) is touched with a finger to excessively charge or discharge the capacitor $C_{231}$. Timer action is then accomplished by throwing the switch $LD_{231}$ to an appropriate fixed contact $G_{231}$ or $G_{232}$.

Here, it is also possible in FIG. 23 not to connect the one end of the discharging resistor $R_{232}$ with the intermediate point of the neon discharge tube $Ne_{231}$ and the resistor $R_{231}$, but to connect it with the gate of the MOS $Tr_1$. Further, the one end of the discharging resistor $R_{232}$ may be connected with the common conductor of the touch portions $P_{231}$ and $P_{232}$. In this case, fowever, a considerably high input voltage is needed compared to the case of FIG. 23.

Figure 24:
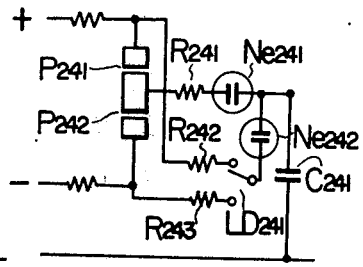
FIG. 24 is an electric circuit diagram showing a modification of the circuit of FIG. 23.

FIG. 24 shows another embodiment of a dimmer device provided with a timer action. In FIG. 23, the excess charging or discharging was done through the touch portion $P_{231}$ or $P_{232}$, but in FIG. 24 the capacitor $C_{241}$ can be rapidly and excessively charged by connecting a contact of the switch $LD_{241}$ with a low resistance $R_{242}$ the other end of which is connected with the touch portion $P_{241}$. Thereafter, when the switch $LD_{241}$ is connected with a high resistance $R_{243}$ the other end of which is connected with the touch portion $P_{242}$, the capacitor $C_{241}$ gradually discharges. In the figure, $R_{241}$ indicates an input resistance, $Ne_{241}$ a neon discharge tube connected in series with said input resistor $R_{241}$, and $Ne_{242}$ another neon discharge tube inserted between the switch $LD_{241}$ and the gate of the MOS (not shown). Here, an opposite action can be achieved by switching between the resistances $R_{242}$ and $R_{243}$.

Figure 25:
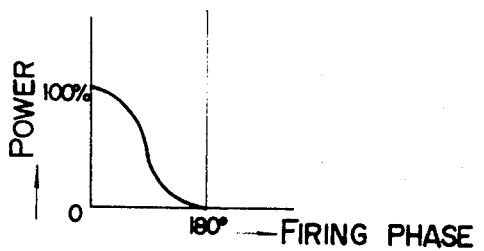
FIG. 25 shows the relation between the firing phase of the thyristor and the power supply to the load in the circuit of FIG. 2.
Figure 26:
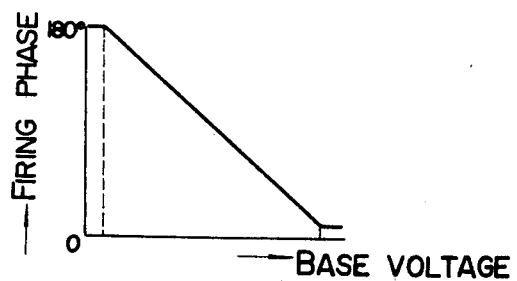
FIG. 26 shows the relation between the base potential of the transistor $Tr_2$ and the firing phase in the circuit of FIG. 2.

According to another embodiment, a dimmer circuit of further improved controlling characteristics than those of the circuit of FIG. 2 can be provided. Namely, in the circuit of FIG. 2 the firing phase of the thyristor $S_4$ and the power consumption in the lamp $L_2$ have a cosinusoidal relationship as is shown in FIG. 25. Since the base voltage of the transistor $Tr_2$ (voltage drop in the resistor $R_9$) and the firing phase are in a linear relation (the transistor $Tr_2$ forms a constant current circuit), as shown in FIG. 26, the relation of the power consumption (the intensity of illumination) with respect to time is cosinusoidal. In the next embodiment, the change in the power consumption (the intensity of illumination) with respect to time is compensated nearly linearly to increase the controlling accuracy. Means for the above purpose will be described below.

First, the power consumption in the lamp $L_2$ with respect to the firing phase of the thyristor $S_4$ in FIG. 2 changes as is shown in FIG. 25. Thus, if the firing phase with respect to the controlling voltage (the output voltage of the MOS $Tr_1$) can be arranged to change as is shown in FIG. 27, the relation of the power consumption with respect to the controlling voltage can be made linear, theoretically.

Figure 27:
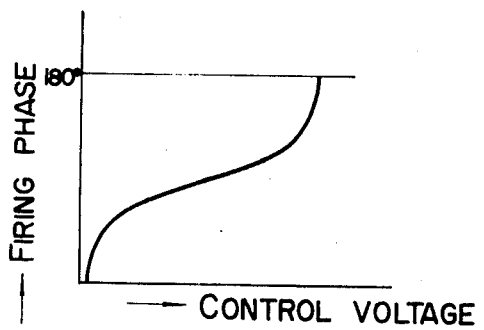
FIG. 27 shows the ideal relation between the controlling voltage and the firing phase for improving the controlling characteristic of the circuit of FIG. 2.

For realizing a change as shown in FIG. 27, the relation of FIG. 27 is approximated by linear segments to thereby compensate the change of the power consumption with respect to time into a nearly linear relation.

Figure 28:
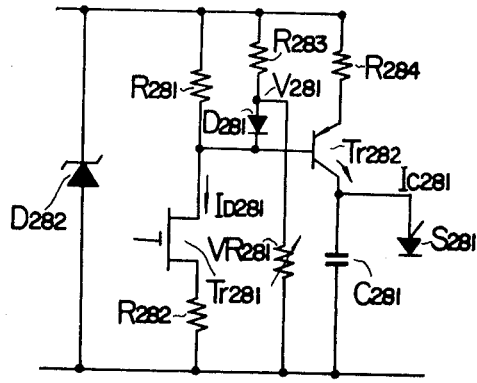
FIG. 28 is a partial electric circuit diagram of a dimmer device according to another embodiment of the present invention.

FIG. 28 shows a partial circuit diagram, in which the source of a MOS $Tr_{281}$ (corresponding to the MOS $Tr_1$ in FIG. 2) is connected with the anode of a Zener diode $D_{282}$ (corresponding to the Zener diode $D_6$) through a resistor $R_{282}$, and the drain of said MOS $Tr_{281}$ is connected with the cathode of said Zener diode through a resistor $R_{281}$. Further, the cathode of a diode $D_{281}$ is connected with the drain of said MOS $Tr_{281}$ and the anode of this diode $D_{281}$ is connected with the cathode of said Zener diode $D_{282}$ through a resistor $R_{283}$. The anode of the diode $D_{281}$ is also connected with the anode of the Zener diode $D_{282}$ through a variable resistor $VR_{281}$. The drain electrode of the MOS $Tr_{281}$ is connected with the base of a pnp transistor $Tr_{282}$ (corresponding to the transistor $Tr_2$ in FIG. 2). The collector of this transistor $Tr_{282}$ is connected with one end of a capacitor $C_{281}$ (corresponding to the capacitor $C_3$) and with the anode of a silicon controlled rectifier element $S_{281}$ (corresponding to the SCR $S_3$). The emitter of said transistor $Tr_{282}$ is connected with the cathode of the Zener diode $D_{282}$ through a resistance $R_{284}$. In the figure, the pre-stage for the MOS $Tr_{281}$ and the post-stage for the SCR $S_{281}$ are similar to those of FIG. 2 and abbreviated.

When the drain current $I_{D281}$ of the MOS $Tr_{281}$ is zero, the anode of the diode $D_{281}$ is applied with a bias voltage determined by the resistor $R_{283}$ and the variable resistor $VR_{281}$. However, since the drain current $I_{D281}$ is zero, the voltage drop in the resistor $R_{281}$ is zero and the diode $D_{281}$ is reverse biased. The voltage between the drain of the MOS $Tr_{281}$ and the anode of the Zener diode $D_{282}$ is zero and the collector current $I_{C281}$ of the transistor $Tr_{281}$ is zero. When the drain current increases, the collector current $I_{C281}$ increases proportionally. This is illustrated by the segment from a point $C_{291}$ to a point $C_{292}$ in FIG. 29. When the drain current increases and the drain voltage becomes lower than the anode bias voltage $V_{281}$ for said diode $D_{281}$ by the voltage drop in the resistor $R_{281}$ (point $C_{292}$ in FIG. 29), the diode $D_{281}$ becomes conductive and the drain current $I_{D281}$ also flows through the resistor $R_{283}$. Thus, the decrease of the drain voltage for the MOS $Tr_{281}$ for the drain current $I_{D281}$ which was represented by $R_{281} \times I_{D281}$ is therefore now represented by the product of the composite parallel resistance of $R_{281}$, $R_{283}$ and $VR_{281}$ and the drain current $I_{D281}$, $(R_{281}//R_{283}//Vr_{281}) \times I_{D281}$. Thus, the slope becomes small as is shown by the solid line beyond the point $C_{292}$ in FIG. 29. As is apparent from the above, the position of the inflection point ($C_{292}$) can be altered by altering the divided voltage $V_{281}$ determined by the resistance $R_{283}$ and the variable resistance $VR_{281}$ and the slope beyond the inflection point $C_{292}$ in FIG. 29 can be altered by altering the composite resistance of the resistors $R_{281}$ and $R_{283}$ and the variable resistor $VR_{281}$.

Figure 29:
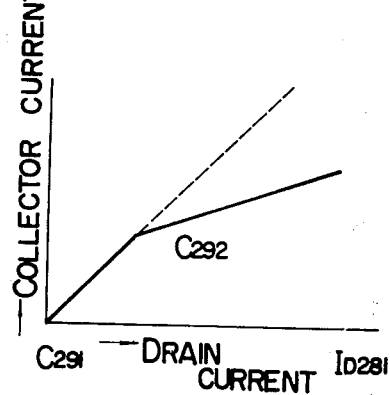
FIG. 29 illustrates the operation of the circuit of FIG. 28.
Figure 30:
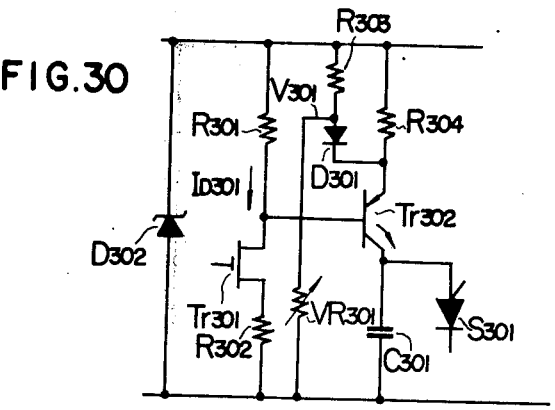
FIG. 30 is a partial electric circuit diagram of a dimmer device according to another embodiment of the present invention.
Figure 31:
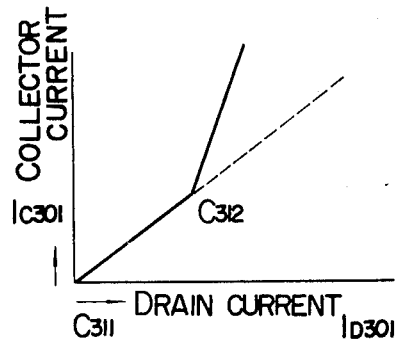
FIG. 31 illustrates the operation of the circuit of FIG. 30.

FIG. 30 shows a partial circuit diagram of another embodiment in which the collector current $I_{C301}$ vs the drain current $I_{D301}$ characteristic shows an opposite change to that of FIG. 29 as is shown in FIG. 31. In FIG. 30, the drain of a MOS $Tr_{301}$ (corresponding to the MOS $Tr_1$ in FIG. 2) is connected with the cathode of the Zener diode $D_{301}$ (corresponding to Zener diode $D_6$) through a resistor $R_{301}$, and the source of the MOS is connected with the anode of the Zener diode $D_{302}$ through a resistor $R_{302}$. The drain of the MOS is also connected with the base of a pnp transistor $Tr_{302}$ (corresponding to the transistor $Tr_2$). The collector of said pnp transistor $Tr_{302}$ is connected with one end of a capacitor $C_{301}$ )corresponding to the capacitor $C_3$) and with the anode of a silicon controlled rectifier $S_{301}$ (corresponding to the SCR $S_3$). The emitter of the pnp transistor $Tr_{302}$ is connected with the cathode of the Zener diode $D_{302}$ through a resistor $R_{304}$ and with the cathode of a diode $D_{301}$. The anode of this diode $D_{301}$ is connected with the cathode of the Zener diode $D_{302}$ through a resistor $R_{303}$ and with the anode of the Zener diode $D_{302}$ through a variable resistor $VR_{301}$. In the figure, the pre-stage for the MOS $Tr_{301}$ and the post-stage for the SCR $S_{301}$ are similar to those of FIG. 28 and not shown.

Here, the anode voltage of the diode $D_{301}$ is a divided voltage $V_{301}$ determined by the resistance $R_{303}$ and the variable resistance $VR_{301}$. When the drain current $I_{D301}$ of the MOS $Tr_{301}$ is zero, the collector current $I_{C301}$ is also zero corresponding to point $C_{311}$ in FIG. 31. Since the collector current $I_{C301}$ is zero, the diode $D_{301}$ is reverse biased. When the drain current increases, the collector current $I_{C301}$ increases proportionally. When the drain current $I_{D301}$ reaches the point $C_{312}$ in FIG. 31, the emitter voltage of the transistor $Tr_{302}$ becomes lower than the anode voltage $V_{301}$ by the voltage drop in the resistor $R_{304}$ and the diode $D_{301}$ is forward biased to become conductive. Thereby, the emitter current of the transistor $Tr_{302}$ begins to flow through the resistor $R_{303}$ and the collector current is formed of a sum of the currents flowing through the resistors $R_{303}$ and $R_{304}$ (the emitter current is nearly equal to the collector current). Thus, beyond the point $C_{312}$ in FIG. 31 the rate of increase in the collector current $I_{C301}$ with respect to the drain current $I_{D301}$ becomes larger. Namely, between the points $C_{311}$ to $C_{312}$ in FIG. 31, the collector current $I_{C301}$ is represented by $I_{C30i} = I_{D301}/R_{304}$, but after the diode $D_{301}$ becomes conductive (beyond the point $C_{312}$) it is represented by $I_{C301} = R_{301} \times I_{D301}/(R_{304}//R_{303}//VR_{301})$. Similar to the circuit of FIG. 28, the inflection point $C_{312}$ in FIG. 31 is changed by the divided voltage $V_{301}$ determined by the resistance $R_{303}$ and the variable resistance $VR_{301}$ and the slope beyond the point $C_{312}$ is charged by the composite resistance of the resistors $R_{303}$ and $R_{304}$ and the variable resistance $VR_{301}$.

Figure 32:
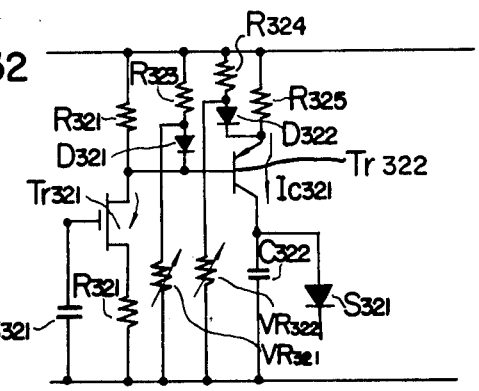
FIG. 32 is an electric circuit diagram of a dimmer device according to another embodiment of the present invention combining the circuits of FIGS. 28 and 30.
Figure 33:
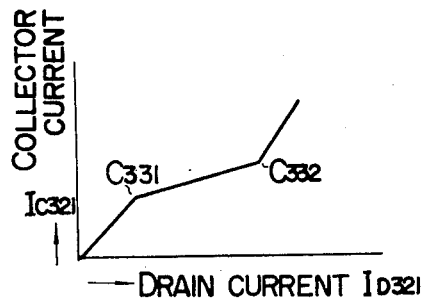
FIG. 33 illustrates the operation of the circuit of FIG. 32.
Figure 34:
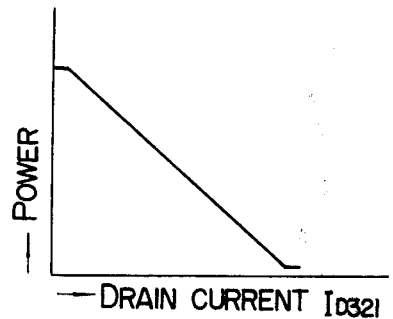
FIG. 34 shows the relation between the drain current and the power consumption in the circuit of FIG. 32.

FIG. 32 shows another embodiment in which the circuits of FIGS. 28 and 30 are combined. The action of this circuit will be readily understood from the description made of said two circuits. In the circuit of FIG. 32, the collector current $I_{C321}$ of the transistor $Tr_{322}$ with respect to the drain current $I_{D321}$ of the MOS $Tr_{321}$ changes as is shown in FIG. 33. Points $C_{331}$ and $C_{332}$ can be shifted by variable resistances $VR_{321}$ and $VR_{322}$, respectively. In FIG. 32, $C_{321}$ indicates a capacitor (corresponding to the capacitor $C_2$ in FIG. 2) connected with the gate of the MOS $Tr_{321}$, $C_{322}$ a capacitor, $S_{321}$ a silicon controlled rectifier, $R_{321}$ to $R_{325}$ resistors, and $D_{321}$ and $D_{322}$ diodes. The respective elements are similar to those in FIG. 28 or 30 and the description for the respective elements are abbreviated. In the circuit of FIG. 32, the relation between the control voltage and the firing phase as shown in FIG. 27 can be approximated by linear segments as shown in FIG. 33. Thus, the collector current $I_{C321}$ is proportional to the firing phase of the thyristor $S_4$ in FIG. 2 and the drain current is proportional to the gate voltage of the MOS $TR_{321}$ (i.e. the charging voltage for the capacitor $C_{321}$). Thereby, the control accuracy can be improved and the power supplied to the load (the intensity of illumination) can be made linearly proportional to the drain current $I_{D321}$ as is shown in FIG. 34. Further, if the constants are selected appropriately, a linear control for the sensitivity of the human eye can be made.

Figure 35:
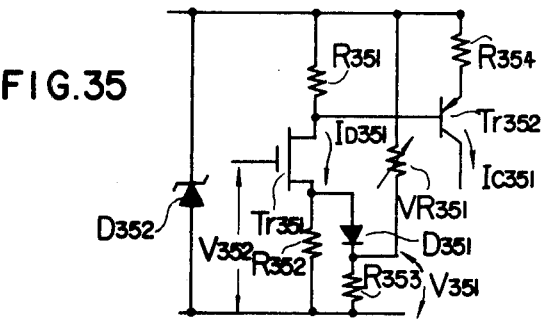
FIG. 35 is an electric circuit diagram of a circuit performing a simmilar action as that of the circuit of FIG. 30.

FIG. 35 shows another embodiment which performs a similar operation to that of FIG. 30. In FIG. 35, the drain of a MOS $Tr_{351}$ is connected with the cathode of a Zener diode $D_{352}$ through a resistor $R_{351}$, and the source is connected with the anode of the Zener diode $D_{352}$ through a resistor $R_{352}$ and with the anode of a diode $D_{351}$. The cathode of the diode $D_{351}$ is connected with the anode of the zener diode $D_{352}$ through a resistor $R_{353}$, and with the cathode of the Zener diode $D_{352}$ through a variable resistor $VR_{351}$. A transistor $Tr_{352}$ has its base connected with the drain of the MOS $Tr_{351}$ and the emitter with the cathode of the Zener diode $D_{352}$ through a resistor $R_{354}$.

Figure 36:
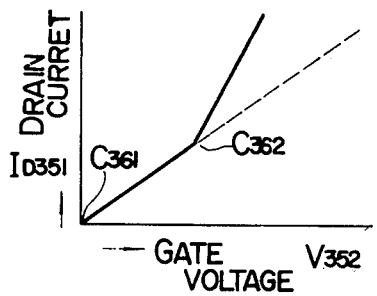
FIG. 36 illustrates the operation of the circuit of FIG. 35.

The cathode of the diode $D_{351}$ is applied with a divided voltage $V_{351}$ determined by the variable resistance $VR_{351}$ and the resistance $R_{353}$. Provided that the MOS $Tr_{351}$ is of the enhancement mode type in which the drain current increases from the point of zero gate voltage (this is assumed only for the purpose of description), as the gate voltage $V_{352}$ increases the drain current $I_{D351}$ also increases as is shown by the segment between the points $C_{361}$ and $C_{362}$ in FIG. 36. When the source voltage exceeds the cathode voltage $V_{351}$ of the diode $D_{351}$ due to the increase in the gate voltage $V_{352}$ of the MOS $Tr_{351}$, the diode $D_{351}$ becomes conductive and the drain current increases by the quality flowing through the resistor $R_{353}$. This is shown by the solid line beyond the point $C_{362}$ in FIG. 36. Similar to the foregoing embodiments, the slope beyond the point $C_{362}$ is altered by the composite resistance of the variable resistance $VR_{351}$, and the resistances $R_{353}$ and $R_{354}$, and the position of the point $C_{362}$ is shifted according to the divided voltage $V_{351}$ determined by the resistance $R_{353}$ and the variable resistance $VR_{351}$.

Figure 37:
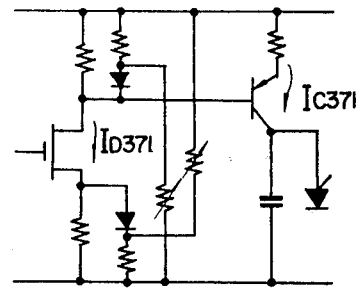
FIG. 37 is an electric circuit diagram of a modification of the circuit of FIG. 32.

FIG. 37 shows another embodiment which is formed by combining the circuits of FIGS. 35 and 28. In this case, the relation of the collector current $I_{C371}$ to the drain current $I_{D371}$ is similar to that of FIG. 33.

Figure 38:
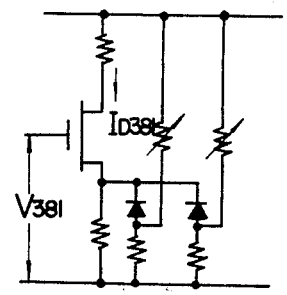
FIG. 38 is an electric circuit diagram of a circuit having multiple stages each of which is similar to the circuit of FIG. 35.
Figure 39:
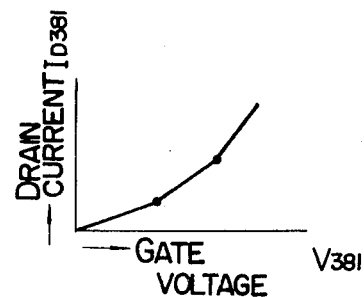
FIG. 39 illustrates the operation of the circuit of FIG. 38.

The controlling characteristic can be improved according to the above embodiments. When more accurate control is needed, the circuit of FIG. 35 may be reformed into multi-stages as in FIG. 38 according to necessity. This also holds for the circuits of FIGS. 28, 30, 32 and 37. The operation will be readily understood from the foregoing description. FIG. 39 shows the relation of the drain current $I_{D381}$ to the gate volage $V_{381}$ in the circuit of FIG. 38.

Figure 40A:
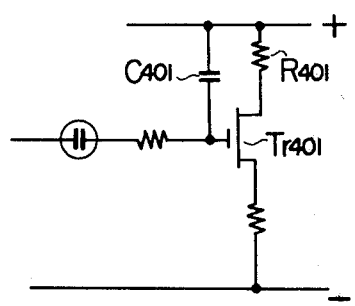
FIGS. 40A and 40B are electric connection diagrams of other examples of the circuit including a MOS transistor and a charge holding capacitor.

In the above embodiments, the charge holding capacitor was connected between the gate of a MOS and one end of a resistor the other end of which is connected with the source of the MOS. The charge holding capacitor may be connected in another way as is shown in FIG. 40A. In FIG. 40A, a capacitor $C_{401}$ is connected between the gate of a MOS $Tr_{401}$ and the other end of the drain resistance $R_{401}$, the one end of which is connected with the drain of said MOS $Tr_{401}$.

Figure 40B:
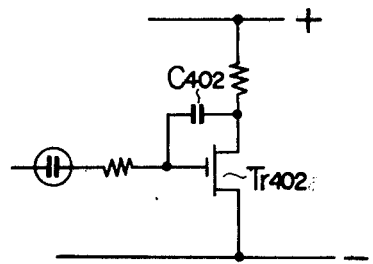

Alternatively, as in FIG. 40B, a Miller integrator circuit may be formed by connecting a capacitor $C_{402}$ between the drain and the gate of a MOS $Tr_{402}$.

Further, except the MOS $Tr_{51}$ in the circuit of FIG. 5, an n-channel MOS was used throughout the embodiments. But a p-chanel MOS may be substituted in place of the n-channel MOS if the polarity or the connection of the power source is altered. Yet further, a junction gate type field effect transistor may also be substituted in place of the MOS if a decrease in the characteristic is neglected to a certain degree. Although a bidirectional thyristor was used for controlling the power, a unidirectional thyristor may be substituted if a decrease in the characteristic can be neglected to a certain degree.

This invention is not limited to a dimmer device but can be applied to any device for achieving control by varying the power supply.

What we claim is:

1. An electronic power varying controller, comprising:
    a rectifying circuit having an A.C. input and a D.C. output and including at least one pair of diodes coupled in series between the D.C. output terminals of said rectifier, said rectifying circuit including a first impedance coupled between one D.C. terminal and one of said diodes and a second impedance coupled between the other D.C. terminal and the other of said diodes;
    a high insulation switch;
    first switch means coupled to the junction of said first impedance and its corresponding diode;
    second switch means coupled to the junction of said second impedance and its corresponding diode;
    means coupling said first and second switch means in common to one terminal of said high insulation switch;
    a field effect transistor having a gate electrode coupled to the other terminal of said high insulation switch;
    a storage capacitor coupled to the gate of said field effect transistor;
    a controlled switch coupled with a load to said A.C. input; and
    a trigger control circuit coupled between said field effect transistor and said controlled switch to trigger said controlled switch into conduction as a function of the voltage across said storage capacitor.

2. The power varying controller according to claim 1, wherein said first switch means comprises a first touch switch for charging said storage capacitor through said high insulation switch and said second switch means comprises a second touch switch for discharging said storage capacitor through said high insulation switch.

3. The power varying controller according to claim 1, wherein said trigger control circuit comprises: a resistor and capacitor; a transistor coupled between said resistor and capacitor and having its control electrode coupled to an output of said field effect transistor; a controlled rectifier coupled to an output of said transistor; and a transformer having one winding coupled to said controlled rectifier and a second winding coupled to said controlled switch.

4. An electronic power varying controller according to claim 1, wherein said rectifying circuit comprises a full-wave rectifier circuit and a Zener diode connected to a prestage of said first and second switch means so that the voltage applied to the high insulation switch is selected by one of said first and second switch means.

5. An electronic power varying controller according to claim 1, wherein said highly insulating switch is a neon tube.

6. An elctronic power varying controller device according to claim 5, further comprising a high frequency oscillator means connected between said switch means and said neon tube, and amplifier means having exposed conductor electrodes for controlling said switch means and said high frequency oscillator means.

7. An electronic power varying controller device according to claim 6, further comprising a receiver for remote control coupled with a sender through a signal medium and controlling said switch means and said high frequency oscillator means.

8. An electronic power varying controller according to claim 1 wherein said field effect transistor is an insulated gate type field effect transistor.

9. An electronic power varying controller according to claim 1, wherein said controlled switch is a bidirectional thyristor.

10. An electronic power varying controller according to claim 1, further comprising remote-controlled switch means connected in parallel with said first and second switch means, and a receiver for remote control coupled with a sender through a signal medium for driving said remote-controlled switch means.

11. An electronic power varying controller according to claim 10, further comprising a second highly insulating switch connected between said remote-controlled switch means and the gate of said field effect transistor to prevent charging and discharging said storage capacitor in the absence of an input.

12. An electronic power varying controller according to claim 1, wherein said highly insulating switch is a highly insulating reed switch, and further comprising amplifier means having exposed conductor electrodes and driving said highly insulating reed switch and said first and second switch means.

13. An electronic power varying controller according to claim 12, further comprising a receiver for remote control coupled with a sender through a signal medium and driving said switch means and said highly insulating reed switch.

14. An electronic power varying controller according to claim 1, further comprising a transistor for preventing excess charging and discharging having a collector connected with said first and second switch means, a base connected with the source of said field effect transistor, and an emitter connected to a variable resistance and a resistance for setting a bias voltage.

15. An electronic power varying controller according to claim 1, further comprising a series connection of a second highly insulating switch, a discharging resistor and further switch means connected between said first and second switch means and the gate of said field effect transistor.

16. An electronic power varying controller according to claim 15, wherein said discharging resistor comprises high and low resistors so that two series circuits can be formed by switching over said further switch means.

17. An electronic power varying controller according to claim 1, further comprising a circuitry including respectively two variable resistors, resistors and diodes between said field effect transistor and said trigger control circuit so as to control the firing phase of said controlled switch with respect to the output voltage of said field effect transistor.

* * * * *